United States Patent
Seo et al.

(10) Patent No.: US 11,625,342 B2
(45) Date of Patent: Apr. 11, 2023

(54) LINK STARTUP METHOD OF STORAGE DEVICE, AND STORAGE DEVICE, HOST AND SYSTEM IMPLEMENTING SAME

(71) Applicant: Samsung Electronics Co., Ltd., Suwon-si (KR)

(72) Inventors: Sungho Seo, Suwon-si (KR); Kwanwoo Noh, Seoul (KR); Myungsub Shin, Suwon-si (KR); Dongwoo Nam, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/241,564

(22) Filed: Apr. 27, 2021

(65) Prior Publication Data

US 2021/0334225 A1 Oct. 28, 2021

(30) Foreign Application Priority Data

Apr. 27, 2020 (KR) .................. 10-2020-0051055
Oct. 21, 2020 (KR) .................. 10-2020-0137077

(51) Int. Cl.
*G06F 13/16* (2006.01)
*G06F 1/14* (2006.01)

(52) U.S. Cl.
CPC ........... *G06F 13/1668* (2013.01); *G06F 1/14* (2013.01)

(58) Field of Classification Search
CPC .................................................. G04F 10/005
See application file for complete search history.

(56) References Cited

U.S. PATENT DOCUMENTS

| | | | |
|---|---|---|---|
| 4,706,215 A * | 11/1987 | Kirschner | G07B 17/00362 705/405 |
| 7,730,343 B2 * | 6/2010 | Bayus | G06F 11/1441 714/4.2 |
| 8,364,927 B2 | 1/2013 | Inoue et al. | |
| 8,996,748 B1 | 3/2015 | Nair et al. | |
| 9,787,543 B2 | 10/2017 | Asai | |
| 9,904,651 B2 | 2/2018 | Park | |
| 10,304,546 B2 * | 5/2019 | Han | G11C 16/20 |
| 2005/0253593 A1 | 11/2005 | Bond et al. | |
| 2006/0187168 A1 | 8/2006 | Okuno | |
| 2013/0297833 A1 | 11/2013 | Vadivelu et al. | |

(Continued)

FOREIGN PATENT DOCUMENTS

| | | |
|---|---|---|
| EP | 0976568 A3 | 5/2000 |
| EP | 2778945 A1 | 9/2014 |

OTHER PUBLICATIONS

European Extended Search Report for corresponding Application No. EP 21163416.7 dated Sep. 14, 2021.

*Primary Examiner* — Henry Tsai
*Assistant Examiner* — Juanito C Borromeo
(74) *Attorney, Agent, or Firm* — Muir Patent Law, PLLC

(57) ABSTRACT

A storage device capable of performing high-speed link startup and a storage system including the storage device are disclosed. A link startup method of the storage device includes receiving a line-reset signal from a host through a line connected to an input signal pin of the storage device, comparing a length of the received line-reset signal with a first reference time, and performing a link startup operation in a high-speed mode or a low-speed mode between the storage device and the host according to a comparing result.

18 Claims, 31 Drawing Sheets

(56) References Cited

U.S. PATENT DOCUMENTS

| 2015/0205339 | A1 | 7/2015 | Park et al. |
| 2016/0142489 | A1 | 5/2016 | Sazuka et al. |
| 2019/0227894 | A1 | 7/2019 | Shih |

* cited by examiner

| PARAMETER | MIN | MAX | UNIT |
|---|---|---|---|
| $T_{LINE-RESET}$ | 3.1 | – | ms |
| $T_{LINE-RESET-DETECT}$ | 1 | 3 | ms |
| $T_{LINE-RESET-HS-LINKUP}$ | 300 | 500 | μs |
| $T_{LINE-RESET-HS-LINKUP-DETECT}$ | 200 | 300 | μs |

HS MODE INITIALIZATION SEQUENCE

LINK STARTUP METHOD OF STORAGE DEVICE, AND STORAGE DEVICE, HOST AND SYSTEM IMPLEMENTING SAME

CROSS-REFERENCE TO RELATED APPLICATIONS

This application is based on and claims priority under 35 U.S.C. § 119 to Korean Patent Application Nos. 10-2020-0051055, filed on Apr. 27, 2020, and 10-2020-0137077, filed on Oct. 21, 2020, in the Korean Intellectual Property Office, the disclosures of which are incorporated by reference herein in their entirety. This application is related to Korean Patent Application No. 10-2020-0021205, filed on Feb. 20, 2020, the disclosure of which is incorporated by reference in its entirety.

BACKGROUND

The inventive concept relates to a memory device, and more particularly, to a link startup method of a storage device, a storage device, controller and system that are configured to perform high-speed link startup.

A storage system may include a host and a storage device. The host may be connected to the storage device through various standard interfaces such as a universal flash storage (UFS) interface, a serial advanced technology attachment (SATA) interface, a small computer small interface (SCSI), a serial attached SCSI (SAS), and an embedded multimedia card (eMMC) interface, for example. When the storage system is used in a mobile device, high-speed operations between the host and the storage device may be very important, and a quick linkup between the host and the storage device may be desired.

SUMMARY

According to an aspect of the inventive concept, there is provided a link startup method of a storage device, the link startup method including receiving a line-reset signal from a host through a line connected to an input signal pin of the storage device, comparing a length of the received line-reset signal with a first reference time, and performing a link startup operation in a high-speed mode or a low-speed mode in response to the comparing, wherein the high-speed mode achieves a linkup state between the host and the storage device faster than the low-speed mode.

According to another aspect of the inventive concept, there is provided a link startup method of a storage device, the link startup method including determining whether a line-reset signal is received from a host through a line connected to an input signal pin of the storage device, and performing one of: in response to the line-reset signal being received from the host, performing a high-speed mode link startup operation between the storage device and the host, and when the line-reset signal is not received from the host, performing a low-speed mode link startup operation between the storage device and the host, wherein the high-speed mode link startup operation achieves a linkup state between the host and the storage device faster than the low-speed mode line startup operation.

According to another aspect of the inventive concept, there is provided a link startup method of a storage device, the link startup method including performing a high-speed mode link startup operation between the storage device and a host, determining whether the high-speed mode link startup operation is completed, when the high-speed mode link startup operation is completed, determining whether a linkup between the storage device and the host as a result of the high-speed mode link startup operation was successful, and when it is determined that the linkup was not successful, performing a low-speed mode link startup operation between the storage device and the host, wherein the high-speed mode link startup operation achieves a linkup state between the host and the storage device faster than the low-speed mode line startup operation.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments will be described in detail with reference to the accompanying drawings.

Figure 1:
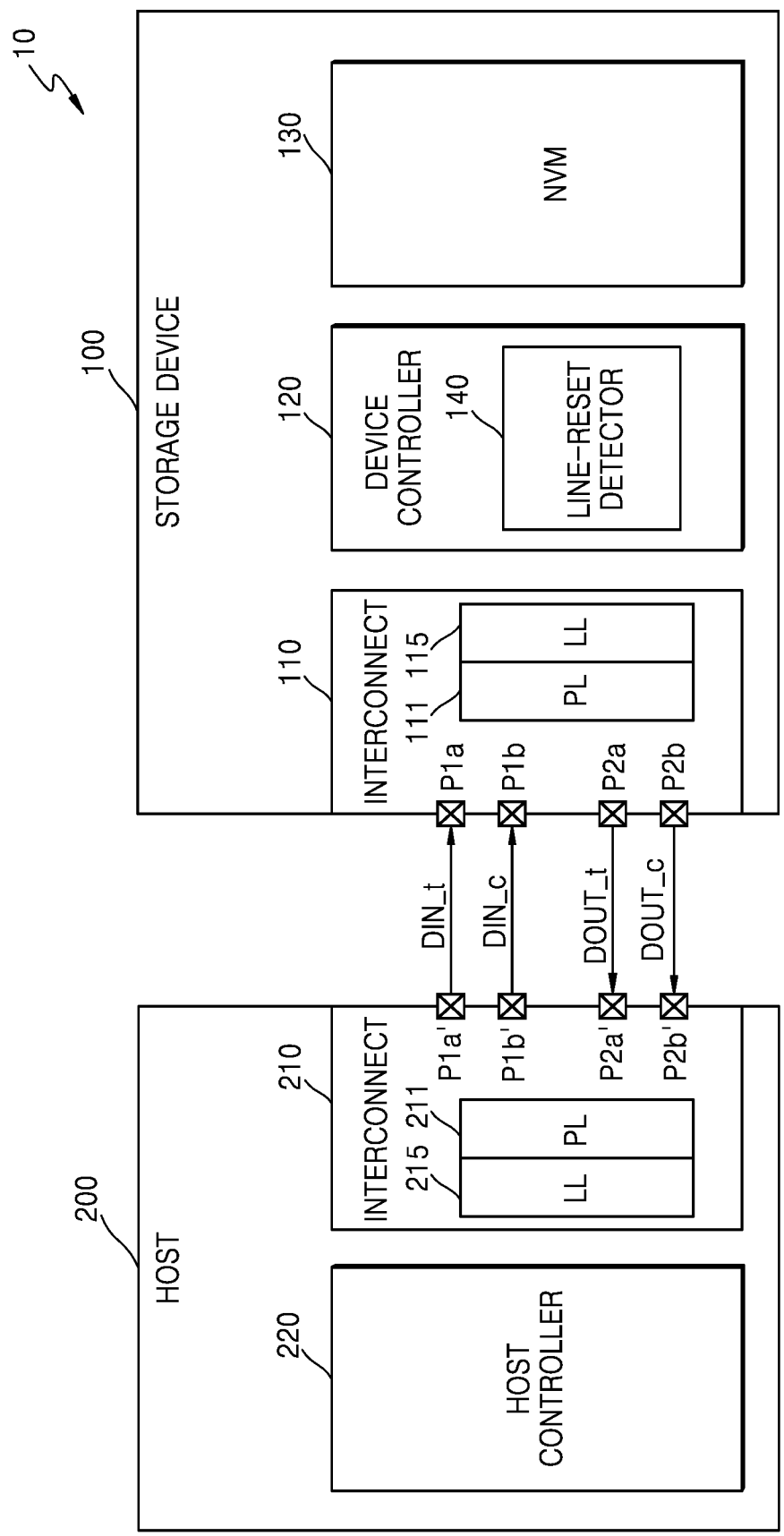
FIG. 1 is a block diagram of a storage system according to an embodiment.

FIG. 1 is a block diagram of a storage system 10 according to an embodiment.

Referring to FIG. 1, the storage system 10 includes a storage device 100 and a host 200. For example, the storage device 100 may be connected to the host 200 according to an interface protocol defined in universal flash storage (UFS) standards, and accordingly, the storage device 100 may include a UFS device and the host 200 may include a UFS host. However, embodiments are not limited thereto, and the storage device 100 may be connected to the host 200 according to various standard interfaces.

The host 200 may include an interconnect circuit 210 and a host controller 220. The host 200 may control a data processing operation, e.g., a data read operation or a data write operation, with respect to the storage device 100. The host 200 may be a data processing device, such as a central processing unit (CPU), a processor, a microprocessor, or an application processor (AP), which may process data. The host 200 may be configured with an operating system (OS) and/or various applications and execute the same. In an embodiment, the storage system 10 may be included in and form part of a mobile device, and the host 200 may be implemented as an AP. In an embodiment, the host 200 may be implemented as a system-on-a-chip (SoC) and included in and form part of an electronic device.

The storage device 100 may include an interconnect circuit 110, a device controller 120, and a non-volatile memory (NVM) 130. The device controller 120 may control access of the NVM 130, such as control the NVM 130 in response to a write request from the host 200 such that data is written to the NVM 130 or control the NVM 130 in response to a read request from the host 200 such that data is read from the NVM 130. The NVM 130 may include a plurality of memory cells, e.g., flash memory cells. In an embodiment, the memory cells may include NAND flash memory cells. However, embodiments are not limited thereto. In some embodiments, the memory cells may include resistive memory cells such as resistive random access memory (RRAM) cells, phase-change RAM (PRAM) cells, or magnetic RAM (MRAM) cells.

Although the interconnect circuit 110 is shown as being separate from the device controller 120 in FIG. 1, the device controller 120 may be integrated with the interconnect circuit 110, which may be the case with respect to other embodiments described herein. For example, when the device controller 120 is implemented as a single chip, the interconnect circuit 110 may also be implemented in the chip.

The host 200 may further include first pins P1$a'$ and P1$b'$, and the storage device 100 may further include first pins P1$a$ and P1$b$ configured to be respectively connected to the first pins P1$a'$ and P1$b'$. The storage device 100 may receive input signals. FIG. 1 illustrates a differential signal transmitted from the host 200 to the storage device 100 as a pair of complementary input signals DIN_t and DIN_c (respectively via a positive wire and a negative wire forming a differential signal line transmitting the differential signal), that is received by the storage device 100 from the host 200 through the first pins P1$a$ and P1$b$ of storage device 100. Accordingly, the first pins P1$a$ and P1$b$ may be referred to as "input signal pins", and signal lines through which the complementary input signals DIN_t and DIN_c are transmitted may constitute a reception lane. For example, the first pin P1$a$ may be referred to as a "positive input signal pin" and may be connected to a positive wire of the differential signal line that transmits DIN_t, and the first pin P1$b$ may be referred to as a "negative input signal pin" and may be connected to a negative wire of the differential signal line that transmits DIN_c. It should be understood that the term "pin" as used herein is not limited to a prong-type connection but instead refers to any conventional terminal connection, such as a pad (e.g., a chip pad, a package pad, etc.) or a bump (solder bump, solder ball, etc.). Also, it should be understood that although FIG. 1 illustrates a single differential signal reception lane from host 200 to storage device 100, this differential signal reception lane is representative, and several such differential signal reception lanes may be provided between host 200 and storage device 100.

In addition, the host 200 may further include second pins P2$a'$ and P2$b'$, and the storage device 100 may further include second pins P2$a$ and P2$b$ configured to be respectively connected to the second pins P2$a'$ and P2$b'$. The storage device 100 may transmit output signals. FIG. 1 illustrates a differential signal transmitted from the storage device 100 to the host 200 as a pair of complementary output signals DOUT_t and DOUT_c transmitted by the storage device 100 to the host 200 through the second pins P2$a$ and P2$b$. Accordingly, the second pins P2$a$ and P2$b$ may be referred to as "output signal pins", and signal lines through which the complementary output signals DOUT_t and DOUT_c are transmitted may constitute a transmission lane. For example, the second pin P2$a$ may be referred to as a "positive output signal pin" and the second pin P2$b$ may be referred to as a "negative output signal pin". It should be understood that although FIG. 1 illustrates a single differential signal transmission lane from storage device 100 to host 200, this differential signal transmission lane is representative, and several such differential signal transmission lanes may be provided between storage device 100 and host 200.

The storage device 100 may further include a line-reset detector 140. Although it is illustrated in FIG. 1 that the device controller 120 includes the line-reset detector 140, embodiments are not limited thereto and the line reset detector 140 may be separate from the device controller 140. The line-reset detector 140 may receive a line-reset signal LINE-RESET from the host 200 and detect the length (duration) of the received line-reset signal LINE-RESET, that is, the length (duration) of a line-reset period. The device controller 120 may perform link startup in a high-speed mode or a low-speed mode (e.g., a pulse width modulation (PWM) mode) based on the detected length of the line-reset signal LINE-RESET. The line-reset signal LINE-RESET will be described in more detail with reference to FIGS. 3 and 4. A detailed operation of the line-reset detector 140 will be described in more detail with reference to FIGS. 5 to 10.

For example, the high-speed mode may be defined as high-speed operation loop consisting of STALL and HS-BURST. STALL may be defined as a power saving state between HS-BURSTS with fast recovery time. HS-BUSRT may be defined as a high speed state including PREPARE, SYNC, MARKERs, and data. PREPARE may be defined as a first part of the HOB after exiting STALL or SLEEP up to but not including the SYNC sequence. SYNC may be defined as an 8b10b symbol sequence with high edge-density intended for fast phase alignment. MARKER may be defined as a non-data symbol, used for protocol related control purposes. For example, the low-speed mode may be defined as combination of SLEEP, PWM-BUSRT, INIT, and LINE-CFG states or combination of SLEEP and SYS-BURST states. SLEEP may be defined as a power saving state used between LS-BURSTS. LS-BURST may be defined as a low speed state including PREPARE, MARKERs, and data.

The interconnect circuits 110 and 210 may respectively form interfaces to provide communication (e.g., data exchange) between the host 200 and the storage device 100. In an embodiment, the interconnect circuit 110 may include a physical layer (PL) 111 and a link layer (LL) 115, and the PL 111 may be circuitry connected to the first and second pins P1a, P1b, P2a, and P2b. Likewise, the interconnect circuit 210 may also include a PL 211 and a LL 215, and the physical layer 211 may be connected to the first and second pins P1a', P1b', P2a', and P2b'. Each of the PLs 111 and 211 may be circuitry for data exchange between the host 200 and the storage device 100. For example, each of the PLs 111 and 211 may include at least one transmitter and at least one receiver. Each of the LLs 115 and 215 may comprise circuitry (e.g., hardware or firmware) to manage the transmission and composition of data and also manage the integrity and error of the data. It will be appreciated that various protocol layers referenced herein may represent and be embodied by physical circuitry (which may be dedicated circuitry) or may be in the form of hardware or firmware (which may be configured by software) to provide certain functions associated with that layer (e.g., as defined by a specification, such as defined by the Unified Protocol (UniPro) specification.)

In an embodiment, when the storage system 10 is a mobile device, the LLs 115 and 215 may be defined by the Unified Protocol (UniPro) specification, and the PLs 111 and 211 may be defined by the M-PHY specification. As a non-limiting example, the UniPro specification may include UniPro specification version 1.8, and the M-PHY specification may include M-PHY specification version 4.1. UniPro and M-PHY are interface protocols introduced by Mobile Industry Processor Interface (MIPI) Alliance. In this case, each of the LLs 115 and 215 may include a physical adapter layer. The physical adapter layer may control the PLs 111 and 211 by managing data symbols and/or power. Hereinafter, an interface between the host 200 and the storage device 100 will be described in detail with reference to FIG. 2 below.

Figure 2:
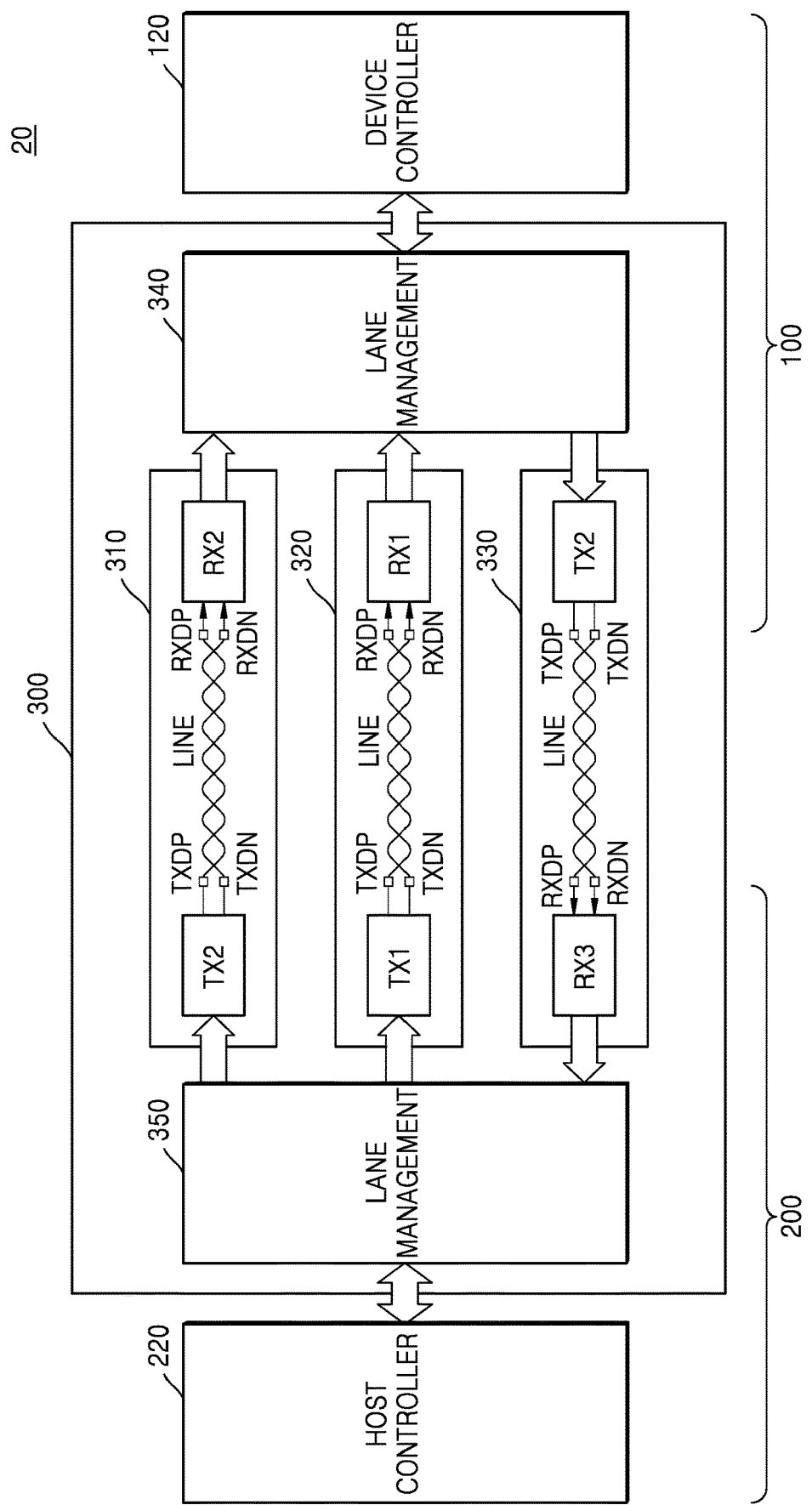
FIG. 2 illustrates an interconnection between a host and a storage device, according to an embodiment.

FIG. 2 illustrates an interconnection 20 (system connection or bus for communication of data and other information) between a host and a storage device, according to an embodiment.

Referring to FIG. 2, the interconnection 20 may include a link 300 between the host controller 220 and the device controller 120. The link 300 may include a plurality of lanes 310, 320, and 330. The link 300 may include at least one lane corresponding to each direction, and the numbers of lanes corresponding to different directions may not be symmetrical. For example, the link 300 may include two lanes 310 and 320 corresponding to a first direction from the host controller 220 to the device controller 120 and one lane 330 corresponding to a second direction from the device controller 120 to the host controller 220, but embodiments are not limited thereto. For example, the two lanes 310 and 320 corresponding to the first direction may constitute a first sub-link, and the one lane 330 corresponding to the second direction may constitute a second sub-link.

Each of the lanes 310, 320, and 330 includes a transmission channel that carries a single unidirectional differential signal (e.g., providing information in the form of data frames each formed of plural data symbols). For example, the lane 320 may include a transmitter TX1, a receiver RX1, and a line LINE interconnecting the transmitter TX1 to the receiver RX1 using a point-to-point link. For example, the transmitter TX1 may be connected to a pin TXDP corresponding to a positive node of a differential signal and a pin TXDN corresponding to a negative node of the differential signal, and the receiver RX1 may be connected to a pin RXDP corresponding to the positive node of the differential signal and a pin RXDN corresponding to the negative node of the differential signal. The line LINE may include two differentially-routed wires respectively connecting the pins TXDP and TXDN of the transmitter TX1 to the pins RXDP and RXDN of the receiver RX1. The wires may correspond to transmission lines.

The link 300 may further include lane management circuits 340 and 350 providing bidirectional data transmission. Although the lane management circuit 350 is separated from the host controller 220 in FIG. 2, embodiments are not limited thereto. The lane management circuit 350 may be included in the host controller 220. Similarly, the lane management circuit 340 is separated from the device controller 120 in FIG. 2, but embodiments are not limited thereto. The lane management circuit 340 may be included in the device controller 120.

Referring to FIGS. 1 and 2, a transmitter (e.g., TX1 or TX2 of FIG. 2) included in the interconnect circuit 210 of the host 200 (see FIG. 1) and a receiver (e.g. RX1 or RX2 of FIG. 2) included in the interconnect circuit 110 of the storage device 100 (see FIG. 1) may form a single lane (e.g., one of lanes 310 and 320 of FIG. 2). Similarly, a receiver (e.g., RX3 of FIG. 2) included in the interconnect circuit 210 of the host 200 (see FIG. 1) and transmitter (e.g., TX3 of FIG. 2) included in the interconnect circuit 110 of the storage device 100 (see FIG. 1) may form a single lane (e.g., lane 330 of FIG. 2). The numbers of transmitters and receivers included in the interconnect circuit 210 of the host may be different from the numbers of transmitters and receivers included in the interconnect circuit 110 of the storage device 100. The capability of the host 200 may be different from that of the storage device 100.

Accordingly, the host 200 and the storage device 100 recognize a lane physically connected thereto and perform processing for receiving each other's information. Accordingly, the host 200 and the storage device 100 perform link startup processing before exchanging data. The host 200 and the storage device 100 may exchange and recognize information about the numbers of transmitters and receivers, information about a lane physically connected to each other, information about the performance of each other, and the like by performing the link startup processing. After the link startup processing is completed, the host 200 and the storage device 100 are set to a linkup state, in which the host 200 and the storage device 100 may stably exchange data with each other.

The link startup processing may be performed during initialization performed when the storage system 10 is initially used or during the booting of the storage system 10. Furthermore, the link startup processing may also be performed during a recovery from an error in the linkup state.

However, the link startup processing may take a long time because it requires exchange of a lot of information about the host 200 and the storage device 100. The link startup processing that takes a long time may degrade the performance of the storage system 10.

However, according to an embodiment, the host 200 may provide a line-reset signal LINE-RESET having a certain length to the storage device 100 through differential input signal lines through which the complementary input signals DIN_t and DIN_c are transmitted when the storage system 10 is initialized or booted, and the storage device 100 may detect the length of the received line-reset signal LINE-RESET to thereby perform link startup processing in a high-speed mode. Accordingly, a time taken for the link startup processing may be reduced, and therefore, the performance of the storage system 10 may be enhanced.

In addition, according to an embodiment, the storage device 100 may perform link startup processing in a high-speed mode or a low-speed mode based on the presence of the line-reset signal LINE-RESET. In addition, according to an embodiment, after power-up or hardware reset, the storage device 100 may first perform link startup processing in a high-speed mode and perform link startup processing in a low-speed mode when linkup is not passed between the host 200 and the storage device 100.

Furthermore, according to some embodiments, a condition for determining an operation mode of link startup processing is not limited to the length or presence of the line-reset signal LINE-RESET. For example, link startup processing may be performed in a high-speed mode or a low-speed mode based on other characteristics, such as the number of times toggling between a logic low and a logic high occurs in the line-reset signal LINE-RESET.

Furthermore, according to some embodiments, a signal used to determine an operation mode of link startup processing is not limited to the line-reset signal LINE-RESET. For example, before link startup processing is performed, other signals that may be transmitted between the host 200 and the storage device 100 may be used instead of the line-reset signal LINE-RESET, and link startup processing may be performed in a high-speed mode or a low-speed mode based on the other signals.

In some embodiments, the storage device 100 may be implemented as a DRAMless device, and the DRAMless device may refer to a device that does not include a dynamic RAM (DRAM) cache. At this time, the device controller 120 may not include a DRAM controller. For example, the storage device 100 may use a portion of the NVM 130 as a buffer memory.

In some embodiments, the storage device 100 may include an internal memory embedded in an electronic device. For example, the storage device 100 may include an embedded UFS memory device, an embedded multimedia card (eMMC), or a solid state drive (SSD). However, embodiments are not limited thereto. The storage device 100 may include NVM, e.g., one time programmable read-only memory (OTPROM), programmable ROM (PROM), erasable and programmable ROM (EPROM), electrically erasable and programmable ROM (EEPROM), mask ROM, or flash ROM. In some embodiments, the storage device 100 may include an external memory removable from an electronic device. For example, the storage device 100 may include at least one selected from a UFS memory card, a compact flash (CF) card, a secure digital (SD) card, a micro-SD card, a mini-SD card, an extreme digital (xD) card, and a memory stick.

The storage system 10 may be implemented as an electronic device such as a personal computer (PC), a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device or portable navigation device (PND), an MP3 player, a handheld game console, or an e-book. The storage system 10 may be implemented in various types of electronic devices including a wearable device such as a watch or a head-mounted display (HMD).

Figure 3:
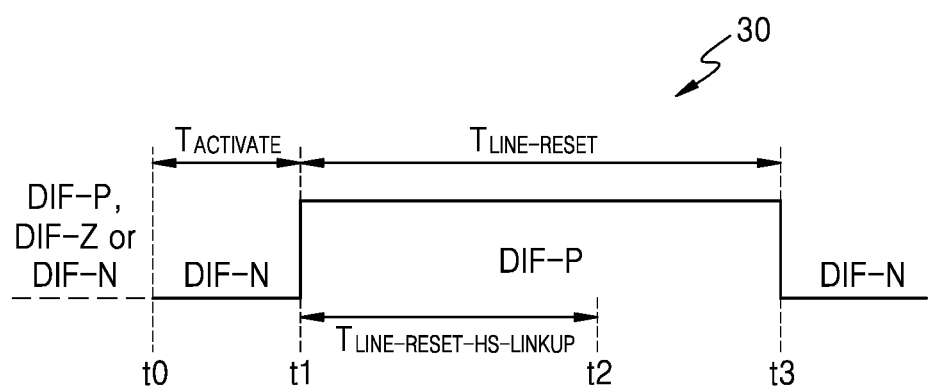
FIG. 3 is a timing diagram illustrating a line-reset signal according to an embodiment.

FIG. 3 is a timing diagram illustrating a line-reset signal LINE-RESET according to an embodiment.

Referring to FIGS. 1 to 3, a voltage 30 of the line LINE may be driven in a DIF-P state with a positive differential line voltage, a DIF-N state with a negative differential line voltage, or a DIF-Z state with an almost zero differential line voltage. Although not shown in the drawings, the line LINE may have a DIF-Q state indicating a high-impedance state, or a DIF-X state other than the DIF-N or DIF-P state. In this case, the differential line voltage may be defined as a value obtained by subtracting the voltage level of a line connected to the negative node from the voltage level of a line connected to the positive node.

The line LINE may correspond to any line included in the interconnection 20, for example, the line LINE may correspond to the pair of differential input signal lines through which the complementary input signals DIN_t and DIN_c of FIG. 1 are transmitted (e.g., a twisted pair of conductive wires). For example, when the voltage level of the first pin P1$a$ to which the positive input signal DIN_t is applied is higher than the voltage level of the first pin P1$b$ to which the negative input signal DIN_c is applied, the line LINE may be in the DIF-P state or a logic high state. For example, when the voltage level of the first pin P1$a$ to which the positive input signal DIN_t is applied is lower than the voltage level of the first pin P1$b$ to which the negative input signal DIN_c is applied, the line may be in the DIF-N state or in a logic low state. For example, when the voltage level of the first pin P1$a$ to which the positive input signal DIN_t is applied is substantially the same as the voltage level of the first pin P1$b$ to which the negative input signal DIN_c is applied, the line may be in the DIF-Z state or in a logic low state.

In an activate period $T_{ACTIVATE}$ between t0 and t1, the line LINE may be driven in the DIF-N state. For example, during the activate period $T_{ACTIVATE}$, the host 200 may drive, in the DIF-N state, a signal (e.g., an activate signal) transmitted through the line LINE to instruct the exit from a power saving state (e.g., a hibernate state HIBERN8). The storage device 100 may exit the power saving state (e.g., the hibernate state HIBERN8) in response to the activate signal. The hibernate state HIBERN8 may be a lower power state as defined by a MIPI specification, such as the UniPro specification or M-PHY specification. In an embodiment, the PL 111 or the LL 115 of the interconnect circuit 110 of the storage device 100 may be preset based on the length of the activate period $T_{ACTIVATE}$. In an embodiment, a link startup operation between the host 200 and the storage device 100 may be performed in a high-speed mode or a low-speed mode based on the length of the activate period $T_{ACTIVATE}$.

In a line-reset period $T_{LINE-RESET}$ between t1 and t3, the line LINE may be driven in the DIF-P state. For example, during the line-reset period $T_{LINE-RESET}$, the host 200 may drive, in the DIF-P state, a signal (e.g., a line-reset signal LINE-RESET) transmitted through the line LINE to instruct a line-reset operation. The storage device 100 may perform a line-reset for resetting the PL 111 of the interconnect circuit 110 in response to the line-reset signal LINE-RESET. "Line-reset" refers to a reset mechanism for resetting the PL 111 of the interconnect circuit 110 through the line LINE during an operation in a malfunction situation.

"Line-reset" may be defined as resetting via the line LINE by means of the exceptional signal condition of a long DIF-P. This is the lowest level reset mechanism in order to reset an M-PHY receive MODULE (M-RX) via the line LINE during operation in case of malfunction. The LINE-RESET condition is a long DIF-P period, which can never occur during normal operation. LINE-RESET can be initiated by the Protocol Layer on an M-PHY transmit MODULE (M-TX) side of a LINK using the M-CTRL-LINERESET.request primitive. This primitive requests the M-TX perform a LINE-RESET action. All configuration settings (rates, amplitudes, etc.) are lost and reset to default values. The M-TX also asserts a signal on the line LINE so that the remote M-RX recognizes the LINE-RESET state.

Before issuing M-CTRL-LINERESET.request with TActivateControl set to "ProtocolControlled", the Protocol Layer issues M-LANE-BurstEnd.request and waits for $T_{ACTIVATE}$ after the M-TX has generated M-LANE-SaveState.indication. This condition ensures the M-TX drives DIF-N for at least $T_{ACTIVATE}$ so that the M-RX, which might be in HIBERN8, is ACTIVATED before the LINE-RESET condition is driven. For LINE-RESET, the M-TX shall drive DIF-P for $T_{LINE-RESET}$.

After the Protocol Layer issues M-CTRL-LINERESET.request with TActivateControl set to "PhyControlled", the M-TX drives DIF-N for $T_{ACTIVATE}$ before driving the LINE-RESET condition. The M-RX shall be reset when DIF-P is observed on the line LINE for $T_{LINE-RESET-DETECT}$. The LINE-RESET timer shall not rely on correct protocol operation. LINE-RESET exits to SLEEP on a transition to DIF-N. LINE-RESET shall reset all configuration settings to their respective default values.

In a line-reset high-speed linkup period $T_{LINE-RESET-HS-LINKUP}$ between t1 and t2, the line LINE may be driven in the DIF-P state. For example, during the line-reset high-speed linkup period $T_{LINE-RESET-HS-LINKUP}$, the host 200 may drive, in the DIF-P state, a signal (e.g., the line-reset signal LINE-RESET) transmitted through the line LINE to instruct a high-speed link startup sequence. The storage device 100 may perform link startup processing in a high-speed mode between the host 200 and the storage device 100 by performing the high-speed link startup sequence in response to the line-reset signal LINE-RESET.

Figure 4:
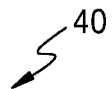
FIG. 4 is a table illustrating line-reset parameters and line-reset high-speed linkup parameters according to an embodiment.

FIG. 4 is a table 40 illustrating line-reset parameters and line-reset high-speed linkup parameters according to an embodiment.

Referring to FIGS. 1, 3, and 4, the line-reset period $T_{LINE-RESET}$ for the host 200 to instruct the line-reset operation of the storage device 100 may be defined as at least 3.1 milliseconds (ms). Accordingly, in order to reset the PL 111 of the interconnect circuit 110 of the storage device 100, the host 200 may drive the voltage of the line LINE in the DIF-P state for a period of about 3.1 ms or more. In other words, the line-reset period $T_{LINE-RESET}$ may correspond to a line-reset parameter of the transmitter.

A minimum value and a maximum value of a line-reset detection period $T_{LINE-RESET-DETECT}$ for the storage device 100 to perform the line-reset operation may be defined as about 1 ms and about 3 ms, respectively. Accordingly, the storage device 100 may perform a line-reset operation for resetting the PL 111 of the interconnect circuit 110 when the length of a period in which the voltage of the line LINE is driven in the DIF-P state is between about 1 ms to about 3 ms. In other words, the line-reset detection period $T_{LINE-RESET-DETECT}$ may correspond to a line-reset parameter of the receiver.

A minimum value and a maximum value of the line-reset high-speed linkup period $T_{LINE-RESET-HS-LINKUP}$ for the host 200 to instruct a high-speed link startup operation of the storage device 100 may be defined as about 300 µs and about 500 µs, respectively. Accordingly, the host 200 may drive the voltage of the line LINE in the DIF-P state for a time between about 300 µs and about 500 µs in order to perform high-speed link startup. In other words, the line-reset high-speed linkup period $T_{LINE-RESET-HS-LINKUP}$ may correspond to a line-reset high-speed linkup parameter of the transmitter.

A minimum value and a maximum value of a line-reset high-speed linkup detection period $T_{LINE-RESET-HS-LINKUP-DETECT}$ for the storage device 100 to perform a high-speed link startup operation may be defined as about 200 µs and about 300 µs, respectively. Accordingly, the storage device 100 may perform a high-speed link startup sequence when the length of the period in which the voltage of the line LINE is driven in the DIF-P state is between about 200 µs and about 300 µs. The storage device 100 may perform a low-speed link startup sequence when the length of the period in which the voltage of the line LINE is driven in the DIF-P state is greater than about 300 µs. In other words, the line-reset high-speed linkup detection period $T_{LINE-RESET-DETECT-HS-LINKUP-DETECT}$ may correspond to a line-reset high-speed linkup parameter of the receiver.

Figure 5:
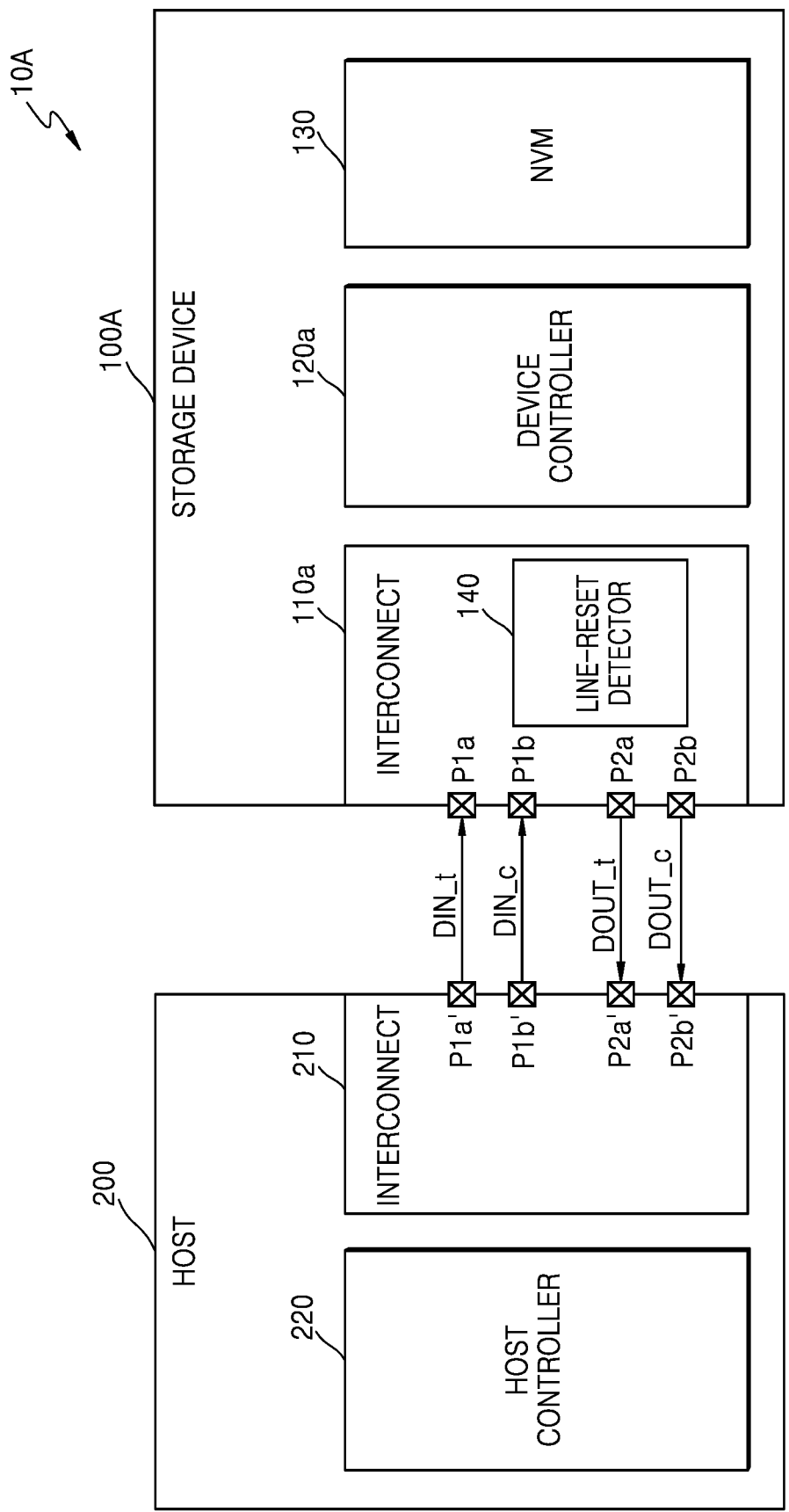
FIG. 5 is a block diagram of a storage system according to an embodiment.

FIG. 5 is a block diagram of a storage system 10A according to an embodiment.

Referring to FIG. 5, the storage system 10A may include a storage device 100A and a host 200A. The storage device 100A may include an interconnect circuit 110a, a device controller 120a, and an NVM 130, and the host 200A may include an interconnect circuit 210a and a host controller 220a. The storage system 10A corresponds to a modification of the storage system 10 of FIG. 1, and descriptions given above with reference to FIGS. 1 to 4 may also be applied to the present embodiment. In the present embodiment, the line-reset detector 140 may be included in the interconnect circuit 110a. For example, the line-reset detector 140 may be included in a PL (e.g., the PL 111 of FIG. 1) of the interconnect circuit 110a.

Figure 6:
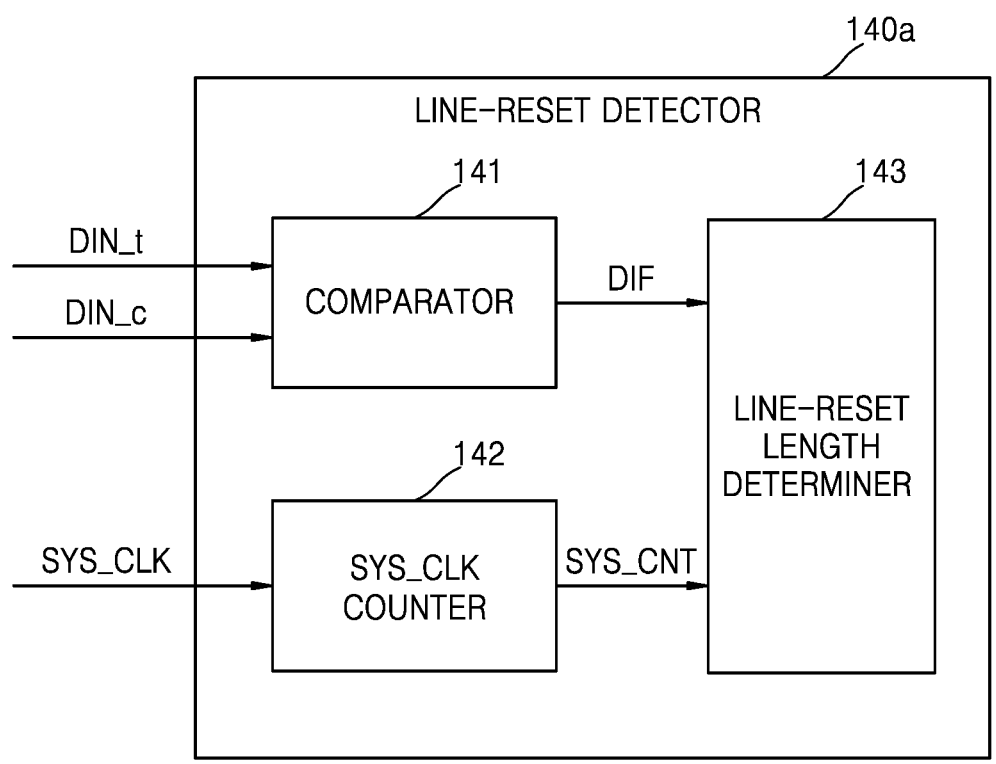
FIG. 6 is a block diagram of a line-reset detector according to an embodiment.
Figure 7:
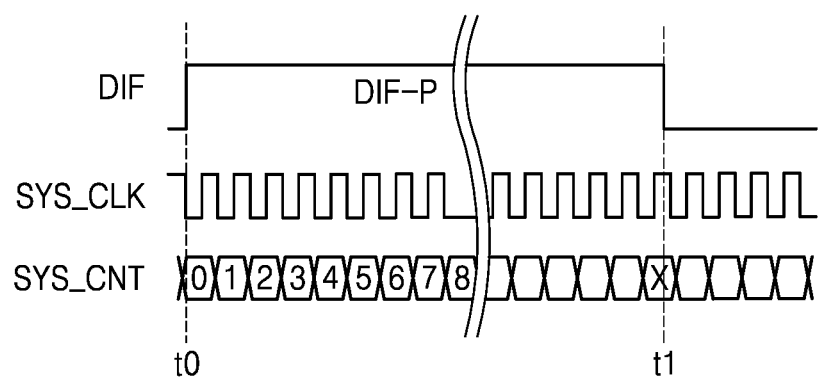
FIG. 7 is a timing diagram illustrating a detection operation of the line-reset detector of FIG. 6, according to an embodiment.

FIG. 6 is a block diagram of a line-reset detector 140a according to an embodiment. FIG. 7 is a timing diagram illustrating a detection operation of the line-reset detector 140a of FIG. 6, according to an embodiment.

Referring to FIGS. 1, 6, and 7, the line-reset detector 140a may include a comparator 141, a system clock counter 142, and a line-reset length determiner 143, and is an example of the line-reset detector 140 of FIG. 1. In this case, a positive input signal DIN_t may be received from the host 200 through the first pin P1a of storage device 100, and a negative input signal DIN_c may be received from the host 200 through the first pin P1b of the storage device 100. A system clock SYS_CLK may be an internal clock signal generated by the storage device 100.

The comparator 141 may generate a differential line voltage DIF by comparing the positive input signal DIN_t with the negative input signal DIN_c. The system clock counter 142 may generate a system clock count value SYS_CNT by counting the number of clocks (i.e., counting the number of periods of the clock, such as counting every transition (or clock edge) of the clock from high to low or vice versa) from the system clock SYS_CLK. The line-reset length determiner 143 may determine a line-reset length based on the differential line voltage DIF and the system clock count value SYS_CNT. For example, the system clock SYS_CLK may be toggled at a first frequency, and during a period in which the differential line voltage DIF maintains a logic high level, that is, during a period of a DIF-P state, the system clock count value SYS_CNT may be generated, for example, as X. Accordingly, the line-reset determiner 143 may determine the line-reset length from the first frequency and the system clock count value SYS_CNT. For example, the system clock count value SYS_CNT at the beginning and the end of the period in which the differential line voltage DIF maintains a logic high level, (that is, the beginning and end of a period of a DIF-P state) may be compared to determine the length (duration) of such period. Alternatively, the system clock count value SYS_CNT may initially be set to zero and operate to count the number of clock periods only when differential line voltage DIF maintains a logic high level (e.g., during a period of a DIF-P state) with the system clock count value SYS_CNT at the termination of differential line voltage DIF maintaining a logic high level (e.g., at the end of the period of a DIF-P state) used to determine the line-reset length (after which, the system clock count value SYS_CNT may be reset to zero for any subsequent line-reset length determination).

Figure 8:
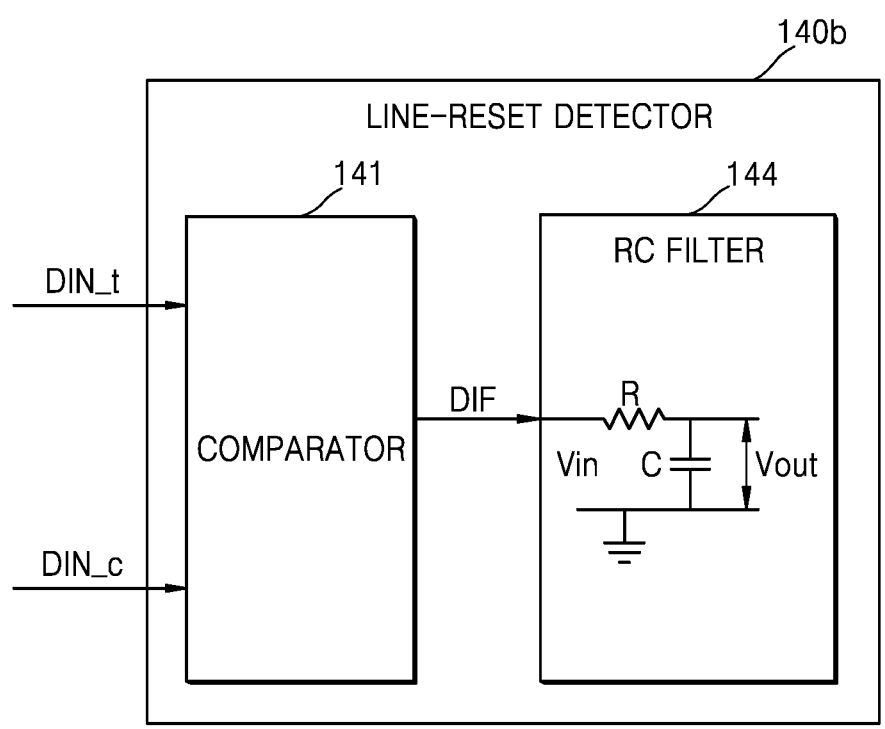
FIG. 8 is a block diagram of a line-reset detector according to an embodiment.

FIG. 8 is a block diagram of a line-reset detector 140b according to an embodiment.

Referring to FIGS. 1 and 8, the line-reset detector 140b may include a comparator 141 and a resistor-capacitor (RC) filter 144, and may correspond to an example of the line-reset detector 140 of FIG. 1. In an embodiment, the RC filter 144 may be included in the PL 111 of the interconnect circuit 110. In an embodiment, the RC filter 144 may be included in the device controller 120.

The comparator 141 may generate a differential line voltage DIF by comparing the positive input signal DIN_t and the negative input signal DIN_c. The differential line voltage DIF may be a single-ended signal corresponding to the difference between the positive input signal DIN_t and the negative input signal DIN_c (e.g., corresponding to the positive input signal DIN_t minus the negative input signal DIN_c). The RC filter 144 may include a resistor (R) and a capacitor (C), and may generate an output voltage Vout from the differential line voltage DIF received as an input voltage Vin. The line-reset detector 140b may detect a line-reset length based on the output voltage Vout1. Specifically, the differential line voltage DIF may be connected to resistor R and the RC filter 144 may detect the output voltage Vout corresponding to the differential line voltage DIF at a first point in time (e.g., t1 in FIG. 10). For example, the first point in time may correspond to a time constant based on the resistance of the resistor R and the capacitance of the capacitor C.

Figure 9:
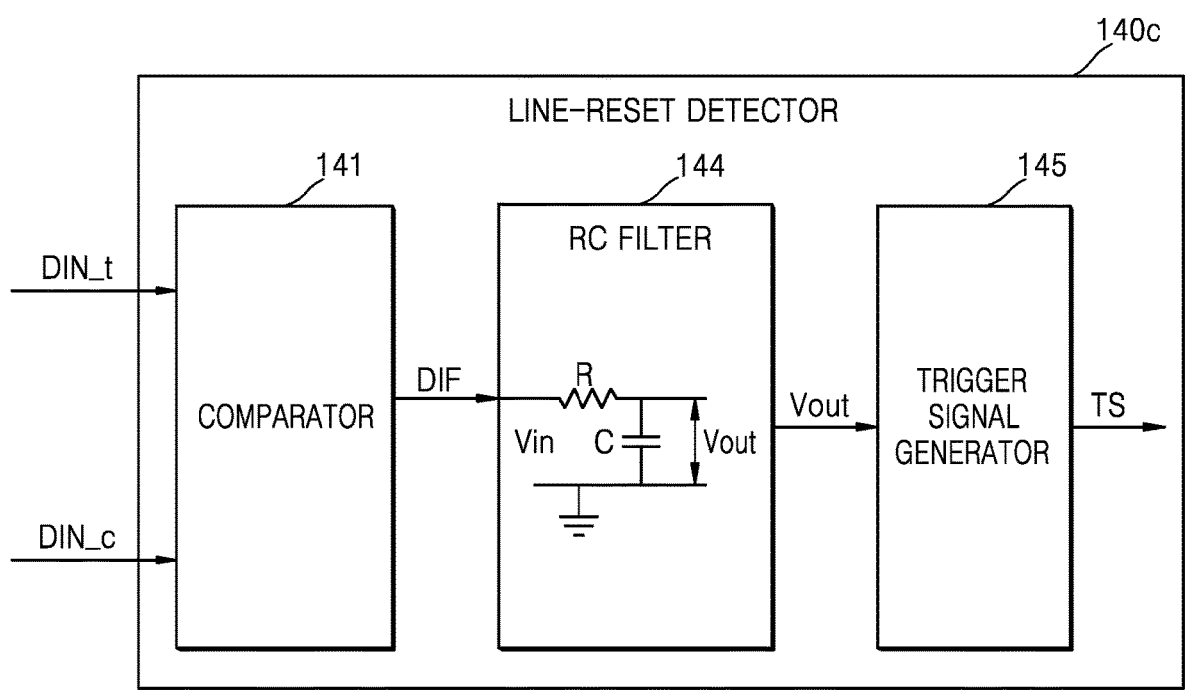
FIG. 9 is a block diagram of a line-reset detector according to an embodiment.

FIG. 9 is a block diagram of a line-reset detector 140c according to an embodiment.

Referring to FIG. 9, the line-reset detector 140c may include a comparator 141, an RC filter 144, and a trigger signal generator 145. The line-reset detector 140c may correspond to a modification of the line-reset detector 140b of FIG. 8, and descriptions given above with reference to FIGS. 1 and 8 may also be applied to the present embodiment. The trigger signal generator 145 may generate a trigger signal TS from an output voltage Vout. For example, the trigger signal generator 145 may be implemented as a pulse generator, and the trigger signal TS may be generated as a pulse waveform. The line-reset detector 140c may detect a line-reset length from the trigger signal TS.

Figure 10:
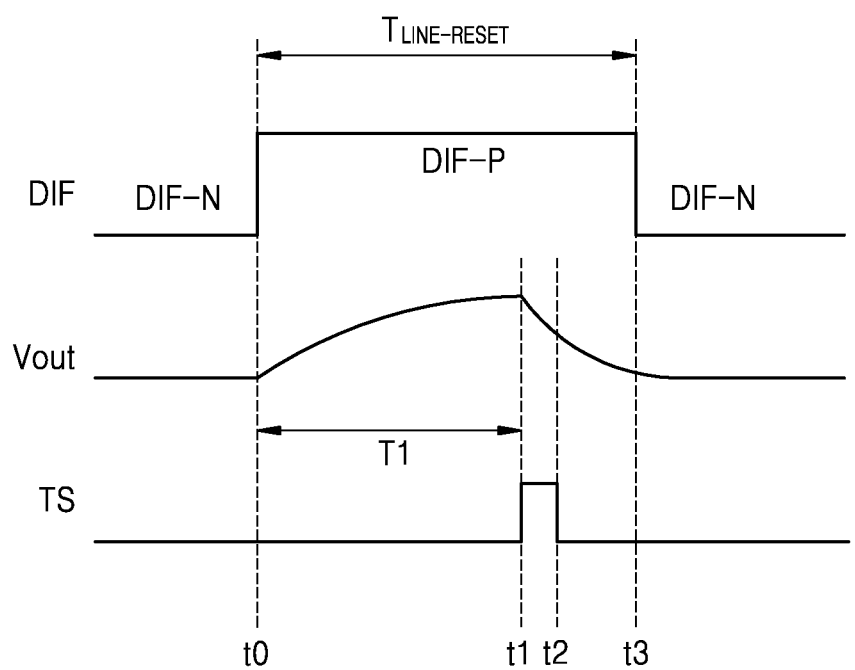
FIG. 10 is a timing diagram illustrating a detection operation of the line-reset detector of FIG. 9, according to an embodiment.

FIG. 10 is a timing diagram illustrating a detection operation of the line-reset detector 140c of FIG. 9, according to an embodiment.

Referring to FIGS. 9 and 10, at t0, a differential line voltage DIF may transition from logic low to logic high, and accordingly, the voltage level of the output voltage Vout may increase. At t1, the RC filter 144 may detect the output voltage Vout corresponding to the differential line voltage DIF, and the trigger signal generator 145 may generate the trigger signal TS that is enabled according to the voltage level of the output voltage Vout. When the voltage level of the output voltage Vout is higher than a reference voltage level, the trigger signal generator 145 may generate a trigger signal, and when the voltage level of the output voltage Vout is lower than the reference voltage level, the trigger signal generator 145 may not generate a trigger signal. In an embodiment, the RC filter 144 may include an internal switch, and when the trigger signal TS is generated, the internal switch of the RC filter 144 may be turned off. Accordingly, after t1, the differential line voltage DIF may not be applied to the RC filter 144, and accordingly, the voltage level of the output voltage Vout may decrease.

For example, a first reference time T1 from t0 to t1 may correspond to a maximum value (e.g., about 300 μs) of the line-reset high-speed linkup detection period $T_{LINE-RESET-HS-LINKUP-DETECT}$. In this case, the time constant of the RC filter 144 may correspond to the first reference time T1. When the trigger signal TS is generated, the line-reset detector 140c may determine that the length of a line-reset signal is greater than the maximum value of the line-reset high-speed linkup detection period $T_{LINE-RESET-HS-LINKUP-DETECT}$. In this case, the host 200 and the storage device 100 may perform link startup in a low-speed mode. On the other hand, when the trigger signal TS is not generated, the line-reset detector 140c may determine that the length of the line-reset signal is less than the maximum value of the line-reset high-speed linkup detection period $T_{LINE-RESET-HS-LINKUP-DETECT}$. In this case, the host 200 and the storage device 100 may perform link startup in a high-speed mode.

In some embodiments, the line-reset detector 140c may include a plurality of RC filters corresponding to the number of detection points. For example, the line-reset detector 140c may include four RC filters for detecting the minimum and maximum values of the line-reset detection period $T_{LINE-RESET-DETECT}$ illustrated in FIG. 4 and the minimum and maximum values of the line-reset high-speed linkup detection period $T_{LINE-RESET-HS-LINKUP-DETECT}$. In this case, the time constants of the four RC filters may correspond to the minimum and maximum values of the line-reset detection period $T_{LINE-RESET-DETECT}$ and the minimum and maximum values of the line-reset high-speed linkup detection period $T_{LINE-RESET-HS-LINKUP-DETECT}$, respectively.

Figure 11:
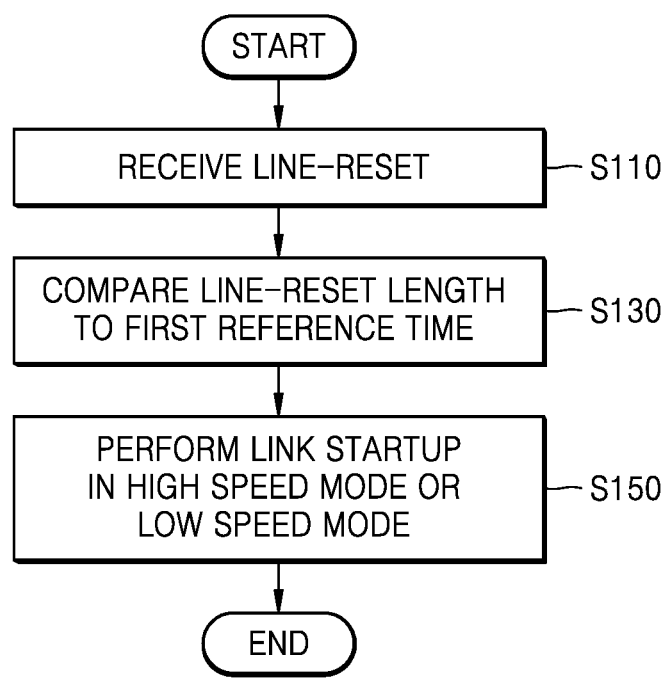
FIG. 11 is a flowchart of an operating method of a storage device, according to an embodiment.

FIG. 11 is a flowchart of an operating method of a storage device, according to an embodiment. Referring to FIG. 11, the operating method of the storage device, according to the present embodiment, corresponds to a link startup operation method of the storage device, and may include, for example, operations performed in time series in the storage device 100 of FIG. 1 or the storage device 100A of FIG. 5. Descriptions given above with reference to FIGS. 1 to 10 may be applied to the present embodiment, and redundant descriptions may be omitted.

In operation S110, the storage device 100 receives a line-reset signal LINE-RESET. For example, the storage device 100 may receive the line-reset signal LINE-RESET from the host 200 through the first pins P1a and P1b. For example, when power is applied to the storage system 10, the storage device 100 may receive the line-reset signal LINE-RESET from the host 200.

In operation S130, the storage device 100 compares a line-reset length corresponding to the length of the received line-reset signal LINE-RESET with a first reference time. For example, the first reference time may correspond to a maximum value (e.g., 300 μs) of the line-reset high-speed linkup detection period $T_{LINE\text{-}RESET\text{-}HS\text{-}LINKUP\text{-}DETECT}$ of FIG. 4. For example, the line-reset detector 140a may detect a line-reset length based on a DIF-P section of the differential line voltage DIF and the system clock count value SYS_CNT (e.g., as described with respect to FIGS. 6 and 7), and may compare the detected line-reset length with the first reference time. For example, the line-reset detector 140b or 140c may detect a line-reset length based on an output voltage corresponding to the differential line voltage DIF at a time corresponding to the first reference time (e.g., as described with respect to FIGS. 8-10), and may compare the detected line-reset length with the first reference time.

In operation S150, the storage device 100 performs link startup in a high-speed mode or a low-speed mode. In an embodiment, when the line-reset length is less than the first reference time, the storage device 100 may perform link startup in a high-speed mode, and when the line-reset length is greater than the first reference time, the storage device 100 may perform link startup in a low-speed mode. However, embodiments are not limited thereto. In an embodiment, when the line-reset length is less than the first reference time, the storage device 100 may perform link startup in a low-speed mode, and when the line-reset length is greater than the first reference time, the storage device 100 may perform link startup in a high-speed mode.

Figure 12:
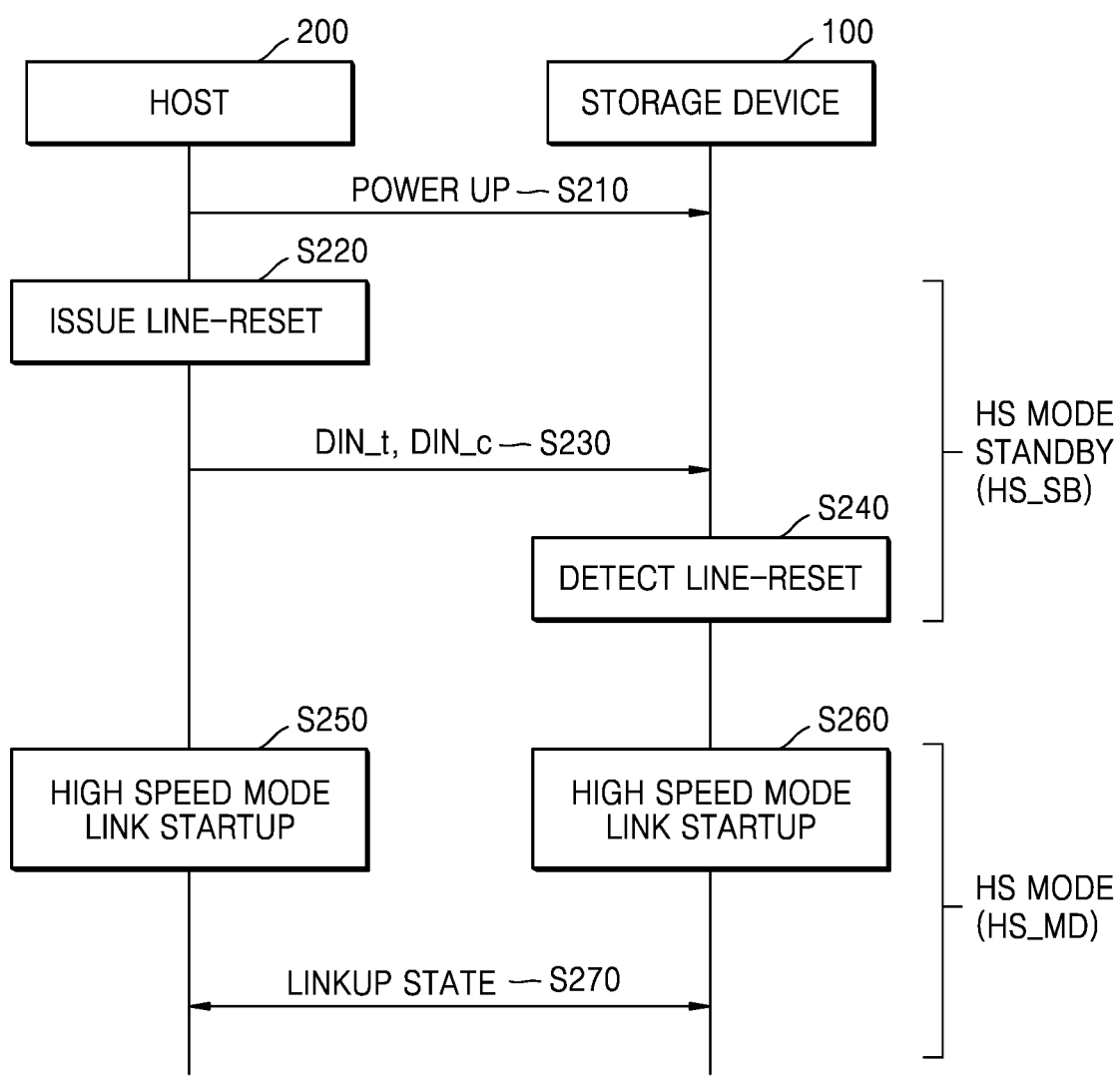
FIG. 12 is a flowchart of an operation between a host and a storage device, according to an embodiment.

FIG. 12 is a flowchart of an operation between the host 200 and the storage device 100, according to an embodiment.

Referring to FIG. 12, in operation S210, power may be applied to the storage system 10. The host 200 may transmit the power to the storage device 100 and initiate a power up operation of the storage device 100 in operation S210. In operation S220, the host 200 generates the line-reset signal LINE-RESET. Specifically, in order to instruct a high-speed link startup operation of the storage device 100, the host 200 may set the length of a line-reset period by setting the line LINE in a DIF-P state longer than a first predetermined duration and/or less than a second predetermined duration, such as setting the line LINE in a DIF-P state for a duration of about 300 μs to about 500 μs.

In operation S230, the host 200 transmits the line-reset signal LINE-RESET to the storage device 100 through differential input signal lines through which the positive input signal DIN_t and the negative input signal DIN_c are transmitted. Specifically, the host 200 may drive the differential input signal lines in the DIF-P state according to the length of the line-reset period set in operation S220. In operation S240, the storage device 100 detects the line-reset signal LINE-RESET received from the host 200 and compares the length of the line-reset signal LINE-RESET with a first reference time. Operations S220 to S240 may correspond to high-speed mode standby HS MODE STANDBY (HS_SB).

In operation S250, the host 200 performs a link startup operation in a high-speed mode. In operation S260, the storage device 100 performs a link startup operation in the high-speed mode. Operations S250 and S260 may be performed substantially at the same time. For example, operation S250 and operation S260 may correspond to operation S150 of FIG. 11. In an embodiment, the link startup operation may include initialization of the PLs 111 and 211 and the LLs 115 and 215. The link startup operation may further include information exchange between the host 200 and the storage device 100. In operation S270, when the link startup operation is completed, the host 200 and the storage device 100 may be set to a linkup state and stably exchange data with each other. Operations S250 through S270 may be performed in a high-speed mode HS_MD.

Figure 13:
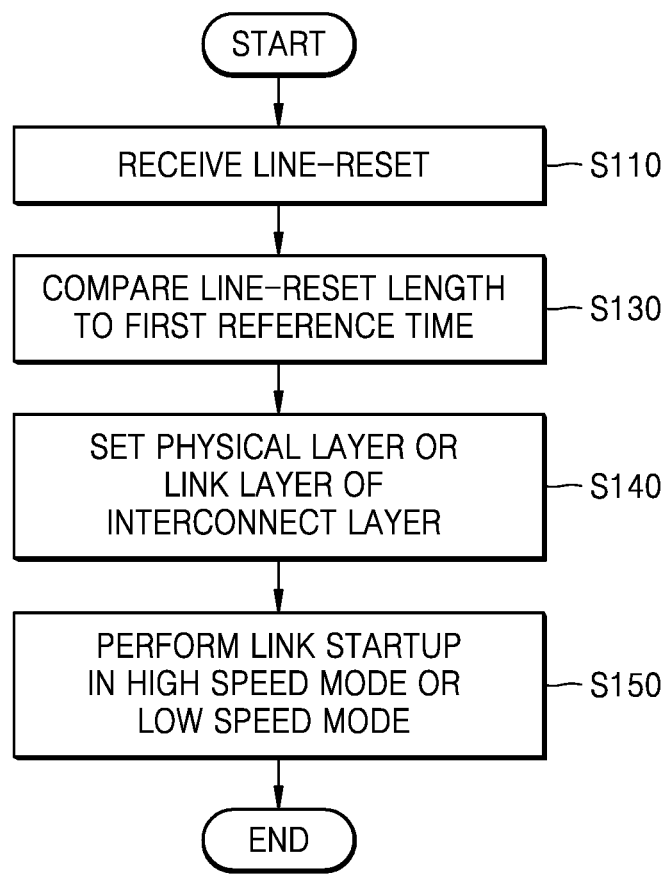
FIG. 13 is a flowchart of an operating method of a storage device, according to an embodiment.

FIG. 13 is a flowchart of an operating method of a storage device, according to an embodiment. Referring to FIG. 13, the operating method of the storage device, according to the present embodiment, corresponds to a link startup operation method of the storage device, and may correspond to a modification of the operating method of FIG. 11. Descriptions given above with reference to FIG. 11 may be applied to the present embodiment, and the following description will be made focusing on differences from FIG. 11.

In operation S110, the storage device 100 receives a line-reset signal LINE-RESET. In operation S130, the storage device 100 compares a line-reset length corresponding to the length of the received line-reset signal LINE-RESET with a first reference time. In operation S140, the storage device 100 sets a PL or an LL of an interconnect layer according to a result of the comparison between the line-reset length and the first reference time. For example, the device controller 120 may set the PL 111 of the interconnect circuit 110 according to the result of the comparison between the line-reset length and the first reference time. For example, the device controller 120 may transmit information about the result of the comparison between the line-reset length and the first reference time to the LL 115 of the interconnect circuit 110. For example, the storage device 100 may initialize the PL 111 and the LL 115 according to the result of the comparison between the line-reset length and the first reference time. In operation S150, the storage device 100 performs link startup in a high-speed mode or a low-speed mode.

Figure 14:
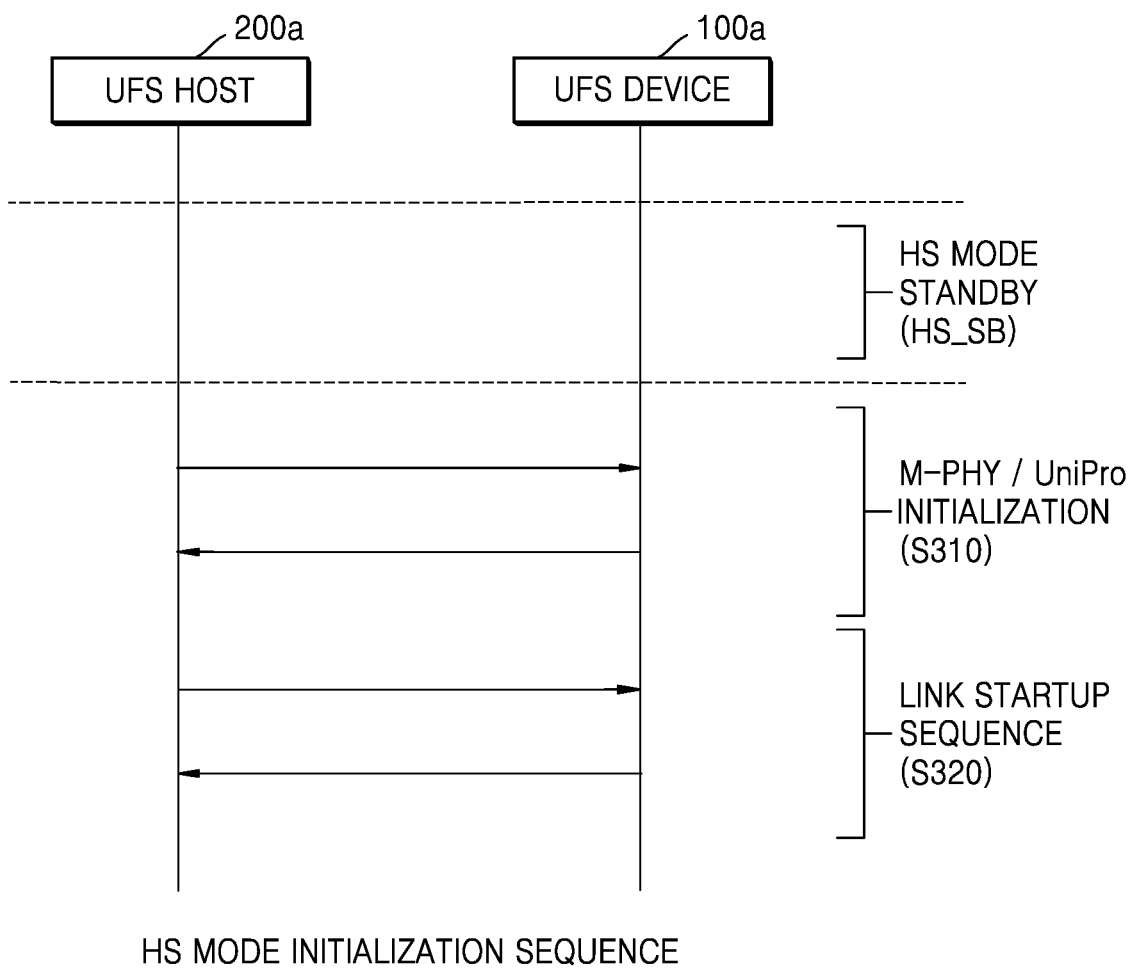
FIG. 14 is a flowchart illustrating a high-speed mode initialization sequence between an universal flash storage (UFS) host and an UFS device, according to an embodiment.

FIG. 14 is a flowchart illustrating a high-speed mode initialization sequence between an UFS host 200a and an UFS device 100a, according to an embodiment.

Referring to FIG. 14, the UFS host 200a may be an example of the host 200 of FIG. 1, and the UFS device 100a may be an example of the storage device 100 of FIG. 1. When power is applied to the UFS host 200a and the UFS device 100a, in a high-speed mode standby (HS_SB) operation, the UFS device 100a may receive a line-reset signal LINE-RESET from the UFS host 200a and determine the length of the received line-reset signal LINE-RESET. When the length of the line-reset signal LINE-RESET is determined, the UFS host 200a and the UFS device 100a may perform a link start-up operation in a high-speed mode. Specifically, the UFS host 200a and the UFS device 100a may perform an M-PHY/UniPro initialization (operation S310) and perform a link startup sequence by exchanging information (operation S320). In this case, the UFS host 200a and the UFS device 100a may simultaneously perform a read operation and a write operation in parallel through a full-duplex low-voltage differential signaling (LVDS) serial interface.

Figure 15:
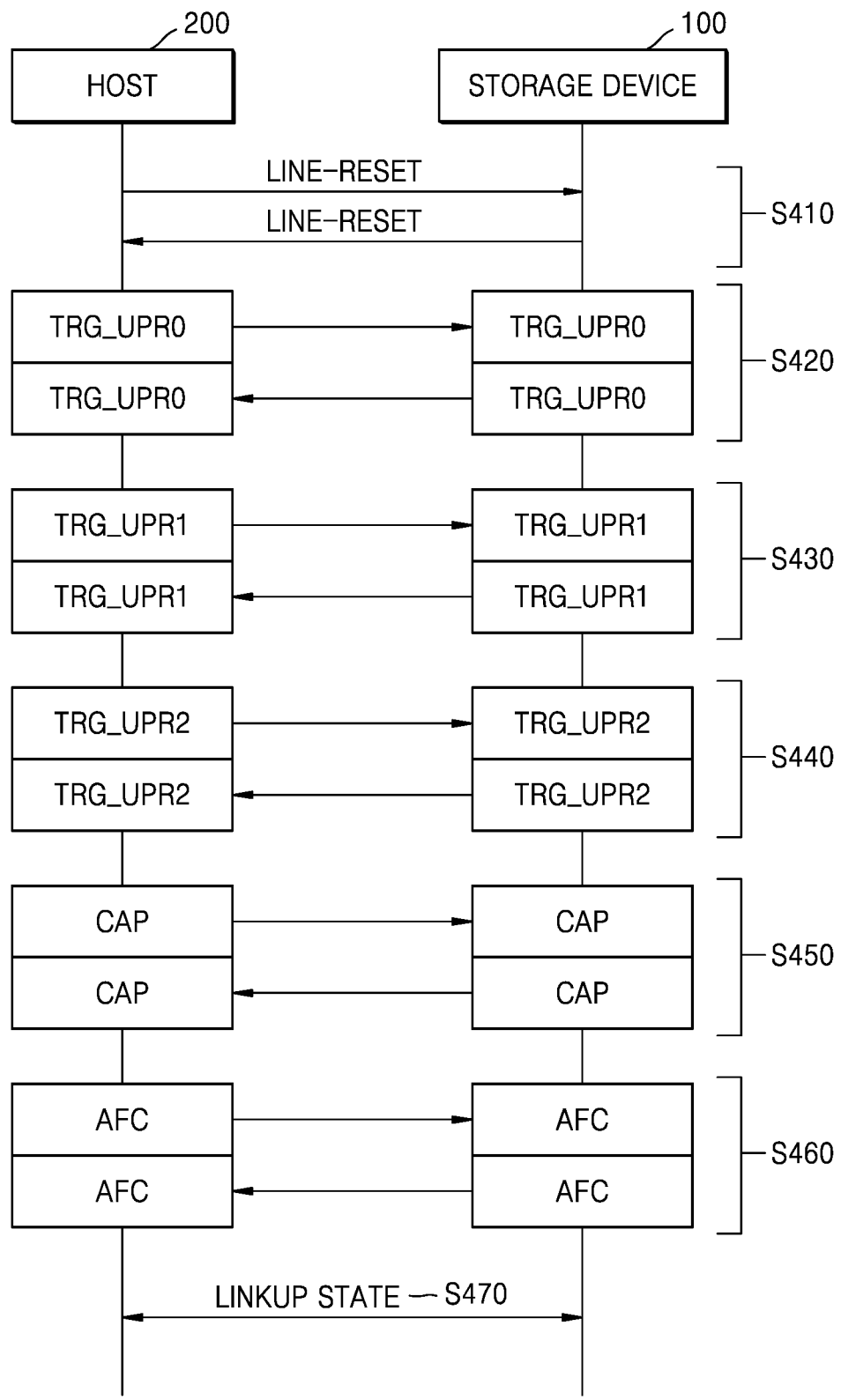
FIG. 15 is a flowchart of a link startup operation between a host and a storage device, according to an embodiment.

FIG. 15 is a flowchart of a link startup operation between the host 200 and the storage device 100, according to an embodiment.

Referring to FIGS. 1 and 15, in operation S410, the host 200 may generate a line-reset signal LINE-RESET, reset transmitters of connected lanes, and transmit, to the storage device 100, information indicating that the transmitters have been reset. In addition, in operation S410, the storage device 100 may receive the line-reset signal LINE-RESET, reset receivers of the connected lanes, and transmit, to the host 200, information indicating that the receivers have been reset. Through this line-reset operation, all attributes of the PLs 111 and 211 of the interconnect circuits 110 and 210 may be reset to default values. The host 200 and the storage device 100 may exchange line-reset information with each other. Operation S410 may be referred to as a line-reset operation. After the line-reset operation is performed, a link startup sequence including operations S420 to S460 may be started.

Operations S420 to S460 may correspond to the link startup sequence. The link startup sequence may be performed in a multi-phase handshake method of exchanging UniPro trigger events between the host 200 and the storage device 100 to establish initial link communication in both directions. The link startup sequence may be defined as certain phases, a trigger event may be used for each of the phases, and each trigger event may be transmitted multiple times.

In first operation S420 of the link startup sequence, connected lanes between the host 200 and the storage device 100 may be found. In first operation S420, the host 200 may send a first trigger event TRG_UPR0 on all available transmission (TX) lanes that transmit to the storage device 100 from the host 200. The host 200 may continue to transmit the first trigger event TRG_UPR0 until the host 200 receives a first trigger event message from the storage device 100. The first trigger event TRG_UPR0 sent from the host 200 may include a physical lane number of a TX lane of the host 200 to which a trigger is transmitted.

Also, in first operation S420, the storage device 100 may send a first trigger event TRG_UPR0 on all available TX lanes that transmit to the host 200 from the storage device 100. The storage device 100 may continue to transmit the first trigger event TRG_UPR0 until the storage device 100 receives a first trigger event message from the host 200. The first trigger event TRG_UPR0 sent from the storage device 100 may include a physical lane number of a TX lane of the storage device 100 to which a trigger is transmitted.

In second operation S430 of the link startup sequence, lanes may be realigned. In second operation S430, the host 200 may send a second trigger event TRG_UPR1 on all available TX lanes that transmit from the host 200 to the storage device 100. The host 200 may continue to transmit the second trigger event TRG_UPR1 until the host 200 receives a second trigger event message from the storage device 100. The second trigger event TRG_UPR1 sent from the host 200 may include information about TX lanes connected to the host 200.

In addition, in second operation S430, the storage device 100 may send a second trigger event TRG_UPR1 on all available TX lanes that transmit to the host 200 from the storage device 100. The storage device 100 may continue to transmit the second trigger event TRG_UPR1 until the storage device 100 receives a second trigger event message from the host 200. The second trigger event TRG_UPR1 sent from the storage device 100 may include information about TX lanes connected to the storage device 100.

In third operation S440 of the link startup sequence, the physical layers of the interconnect circuits 110 and 210 may reflect in attributes of the PLs 111 and 211 of the interconnect circuits 110 and 210 how many connected lanes, that is, how many available lanes, are between the host 200 and the storage device 100. In third operation S440, the host 200 may send a third trigger event TRG_UPR2 on all available TX lanes that transmit to the storage device 100 from the host 200. The host 200 may continue to transmit the third trigger event TRG_UPR2 until the host 200 receives a message corresponding to the third trigger event TRG_UPR2 from the storage device 100. The third trigger event TRG_UPR2 sent from the host 200 may include logical lane numbers for TX lanes connected to the host 200.

In addition, in third operation S440, the storage device 100 may sent a third trigger event TRG_UPR2 on all available TX lanes that transmit to the host 200 from the storage device 100. The storage device 100 may continue to transmit the third trigger event TRG_UPR2 until the storage device 100 receives a third trigger event message corresponding to the third trigger event TRG_UPR2 from the host 200. The third trigger event TRG_UPR2 sent from the storage device 100 may include logical lane numbers for TX lanes connected to the storage device 100.

As third operation S430 of the link startup sequence is performed, the host 200 and the storage device 100 may have matched logical lane numbers for available lanes. At this point, the host 200 and the storage device 100 may end the link startup sequence and perform a capability exchange.

In operation S450, the host 200 and the storage device 100 may exchange and recognize CAP information (capability information) about the performance of each other in order to communicate architectural requirements of the interconnect circuits 210 and 110 with each other. The architectural requirements of the interconnect circuits 210 and 110 represented by the CAP information may include, for example, bandwidths, timers, speed gear, termination/untermination, scrambling, and the like. Operation S450 may be referred to as a performance exchange operation. As the performance exchange operation S450 is performed, the CAP information about the performance of each other may be collected in the interconnect circuits 210 and 110, and attributes of the PLs of the interconnect circuits 210 and 110 may be set according to the collected CAP information.

In operation S460, the host 200 and the storage device 100 may exchange a control frame, such as an AFC control frame (Acknowledgement Flow Control control frame) with each other in order to provide a reliable data link. To this end, the host 200 and the storage device 100 may send an initial data frame to each other, and a device receiving the data frame from among the host 200 and the storage device 100 may send back an AFC control frame to a device transmitting the data frame from among the host 200 and the storage device 100. The AFC control frame may be configured differently from the data frame, and may be used to allow the transmitting device to recognize that the data frame has been correctly received by the receiving device, and to inform a buffer space of an available data link layer. In operation S470, when the link startup operation is completed, the host 200 and the storage device 100 may be set to a linkup state and may stably transmit and receive data to and from each other.

Figure 16:
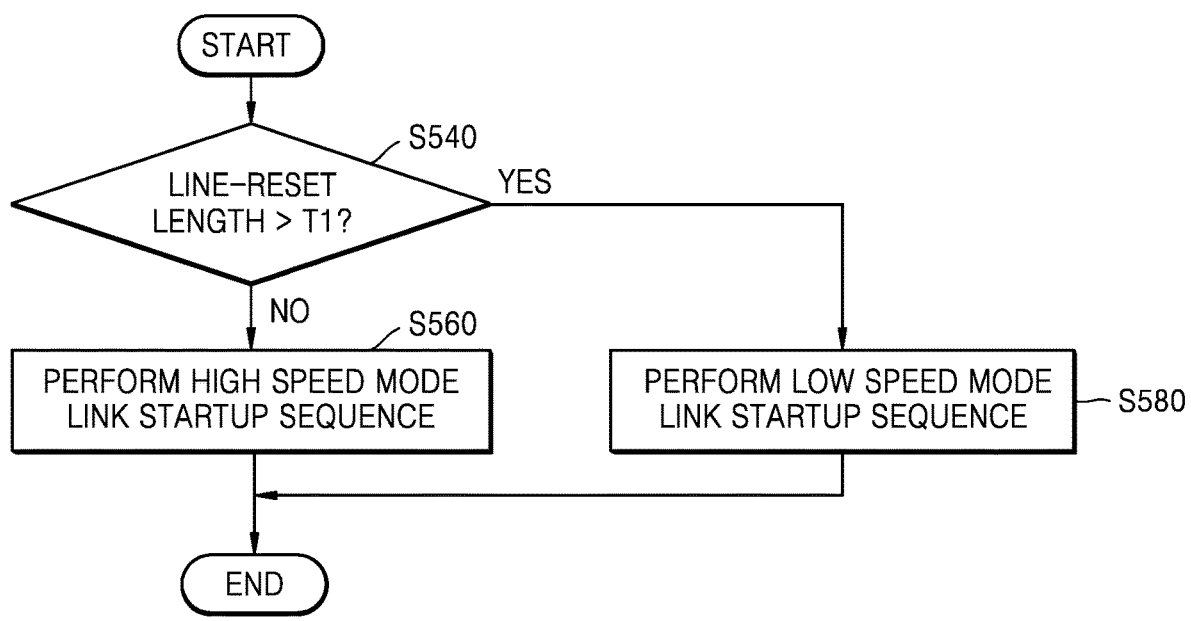
FIGS. 16 to 18 are flowcharts of link startup methods of storage devices, respectively, according to some embodiments.

FIG. 16 is a flowchart of a link startup method of a storage device, according to an embodiment. Referring to FIG. 16, the link startup method of the storage device, according to the present embodiment, may correspond to an example implementation of the link startup method of FIG. 11, and may include operations that are performed in a time series in the storage device 100 of FIG. 1. Hereinafter, the link startup method will be described with reference to FIGS. 1, 3, 4 and 16.

In operation S540, the storage device 100 determines whether the line-reset length is greater than the first reference time T 1. For example, the first reference time T1 may correspond to a maximum value (e.g., about 300 μs) of the line-reset high-speed linkup detection period $T_{LINE-RESET-HS-LINKUP-DETECT}$. In this case, the line-reset length may correspond to the length of a line-reset signal, for example, the length of a period in which the differential line voltage DIF is driven in a DIF-P state. For example, the differential line voltage DIF may correspond to a voltage level difference between the positive input signal DIN_t and the negative input signal DIN_c respectively received from the first pins P1*a* and P1*b* of FIG. 1. For example, operation S540 may correspond to operation S420 of FIG. 15.

As a result of the determination, when the line-reset length is not greater than the first reference time T1, the storage device 100 performs, in operation S560, a high-speed mode link startup sequence. For example, operations S430 to S460 of FIG. 15 may be performed in a high-speed mode. On the other hand, when the line-reset length is greater than the first reference time T1, the storage device 100 performs a low-speed mode link startup sequence. For example, operations S430 to S460 of FIG. 15 may be performed in a low-speed mode, that is, a PWM (pulse width modulation) mode.

In low-speed mode link startup performed by a PWM method, when information required for link startup is exchanged between the storage device 100 and the host 200 through a lane (transmission lane or reception lane), bits for indicating information necessary for link startup are expressed through a pulse width of a signal transmitted through the lane. In the low-speed mode link startup performed by the PWM method, a return to zero (RZ) method, in which a logic low period has to be between logic high periods of a signal transmitted through the lane, is used.

In contrast, in high-speed mode link startup, bits for indicating information required for link startup are expressed through the logic level of a signal transmitted through the lane, and a non-return to zero (NRZ) method, in which there is no need for a logic low period between logic high periods even if a logic high period is continuous, is used. Accordingly, the high-speed mode link startup operation may be performed at a higher speed and in less time to obtain a linkup state between the host 200 and the storage device 100 than the low-speed mode link startup operation.

Figure 17:
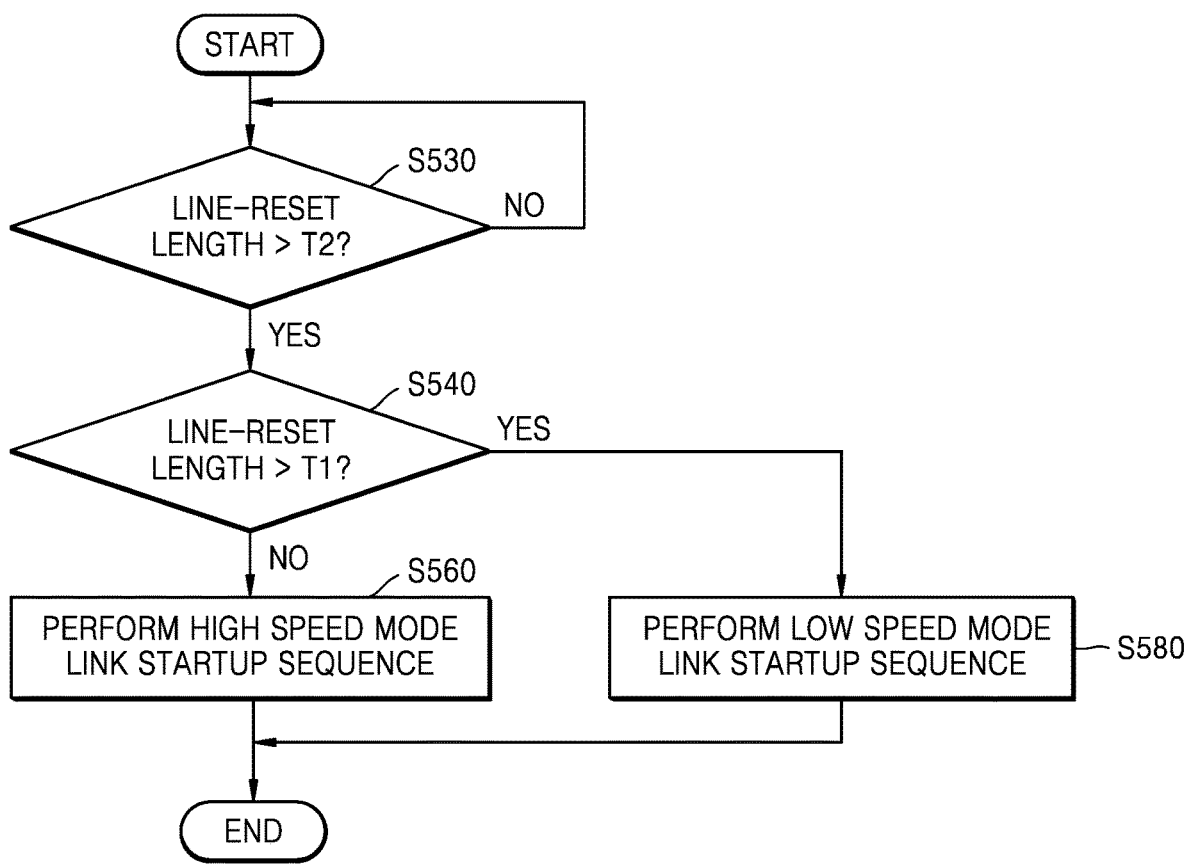

FIG. 17 is a flowchart of a link startup method of a storage device, according to an embodiment. Referring to FIG. 17, the link startup method of the storage device, according to the present embodiment, may correspond to a modification of the link startup method of FIG. 16, and redundant descriptions may be omitted.

In operation S530, the storage device 100 determines whether the line-reset length is greater than a second reference time T2. For example, the second reference time T2 may correspond to a minimum value (e.g., about 200 μs) of the line-reset high-speed linkup detection period $T_{LINE-RESET-HS-LINKUP-DETECT}$ of FIG. 4. As a result of the determination, when the line-reset length is greater than the second reference time T2, the storage device 100 determines, in operation S540, whether the line-reset length is greater than the first reference time T1. According to the present embodiment, when the line-reset length is not greater than the second reference time T2 even if the line-reset length is less than the first reference time T1, the link startup sequence may not be performed.

Figure 18:
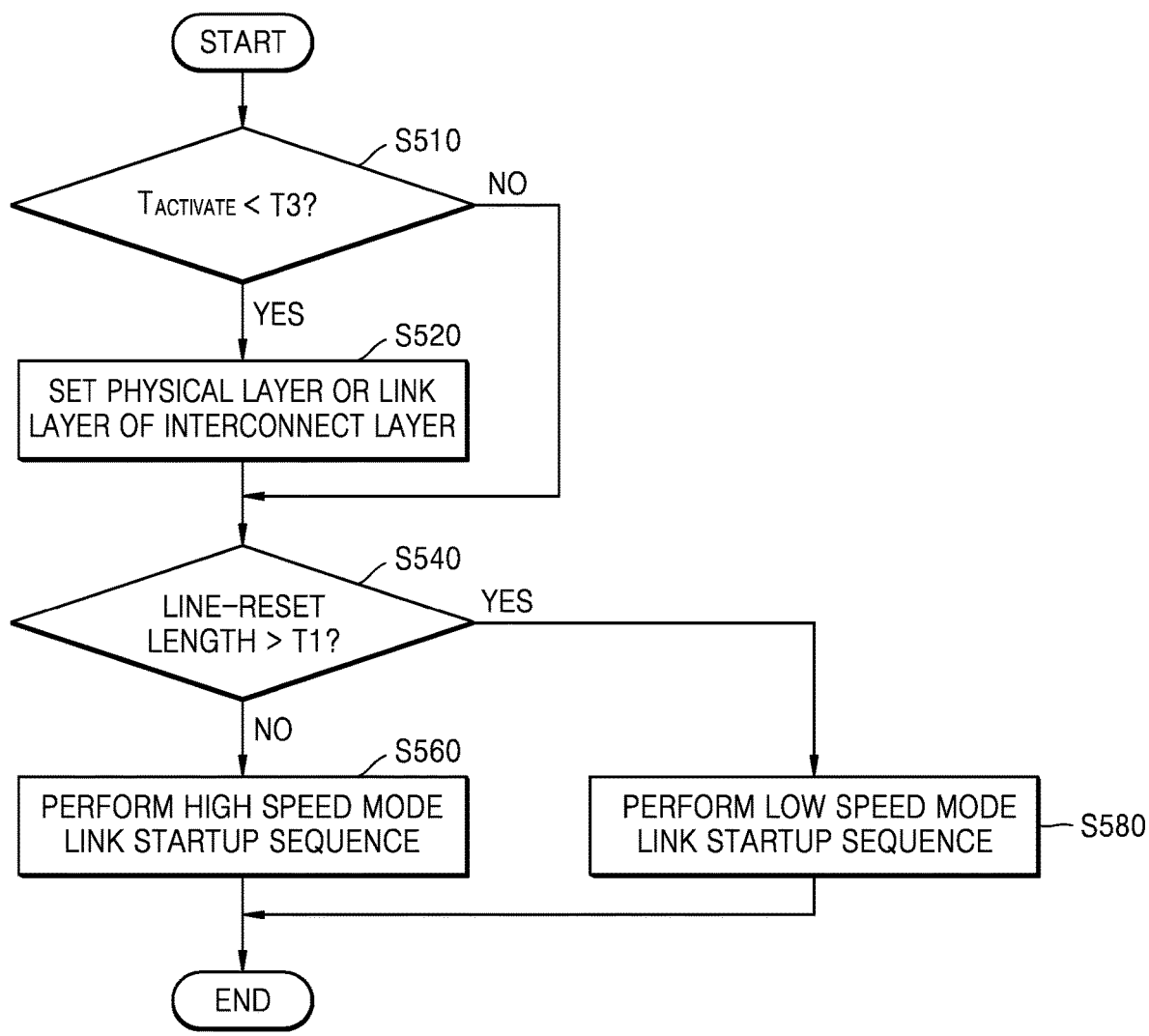

FIG. 18 is a flowchart of a link startup method of a storage device, according to an embodiment. Referring to FIG. 18, the link startup method of the storage device, according to the present embodiment, may correspond to a modification of the link startup method of FIG. 16, and redundant descriptions may be omitted.

In operation S510, the storage device 100 determines whether the length of the activate period $T_{ACTIVATE}$ is less than a third reference time T3. For example, the third reference time T3 may be about 0.9 ms. As a result of the determination, when the length of the activate period $T_{ACTIVATE}$ is less than the third reference time T3, the storage device 100 sets, in operation S520, a PL and/or an LL of an interconnect layer to a default configuration, such as a configuration to perform a high-speed link startup sequence. For example, in operation 520, the device controller 120 may preset the PL 111 in a default configuration to perform a high-speed link startup sequence. For example, in operation 520, the device controller 120 may preset the LL 115 of the interconnect circuit 110 in a default configuration to perform a high-speed link startup sequence. For example, in operation 520, the storage device 100 may initialize the PL 111 and the LL 115 to perform a high-speed link startup sequence. On the other hand, when the length of the activate period $T_{ACTIVATE}$ is not less than the third reference time T3, operation S540 is immediately performed.

In operation S540, the storage device 100 determines whether the line-reset length is greater than the first reference time T1. As a result of the determination, when the line-reset length is not greater than the first reference time T1, the storage device 100 performs, in operation S560, a high-speed mode link startup sequence. On the other hand, when the line-reset length is greater than the first reference time T1, the storage device 100 performs a low-speed mode link startup sequence. As described above, according to the present embodiment, in order to determine an operation mode for performing a link startup sequence, a two-step determination method in which the length of the activate period $T_{ACTIVATE}$ is determined and then the line-reset length is determined may be used.

Figure 19:
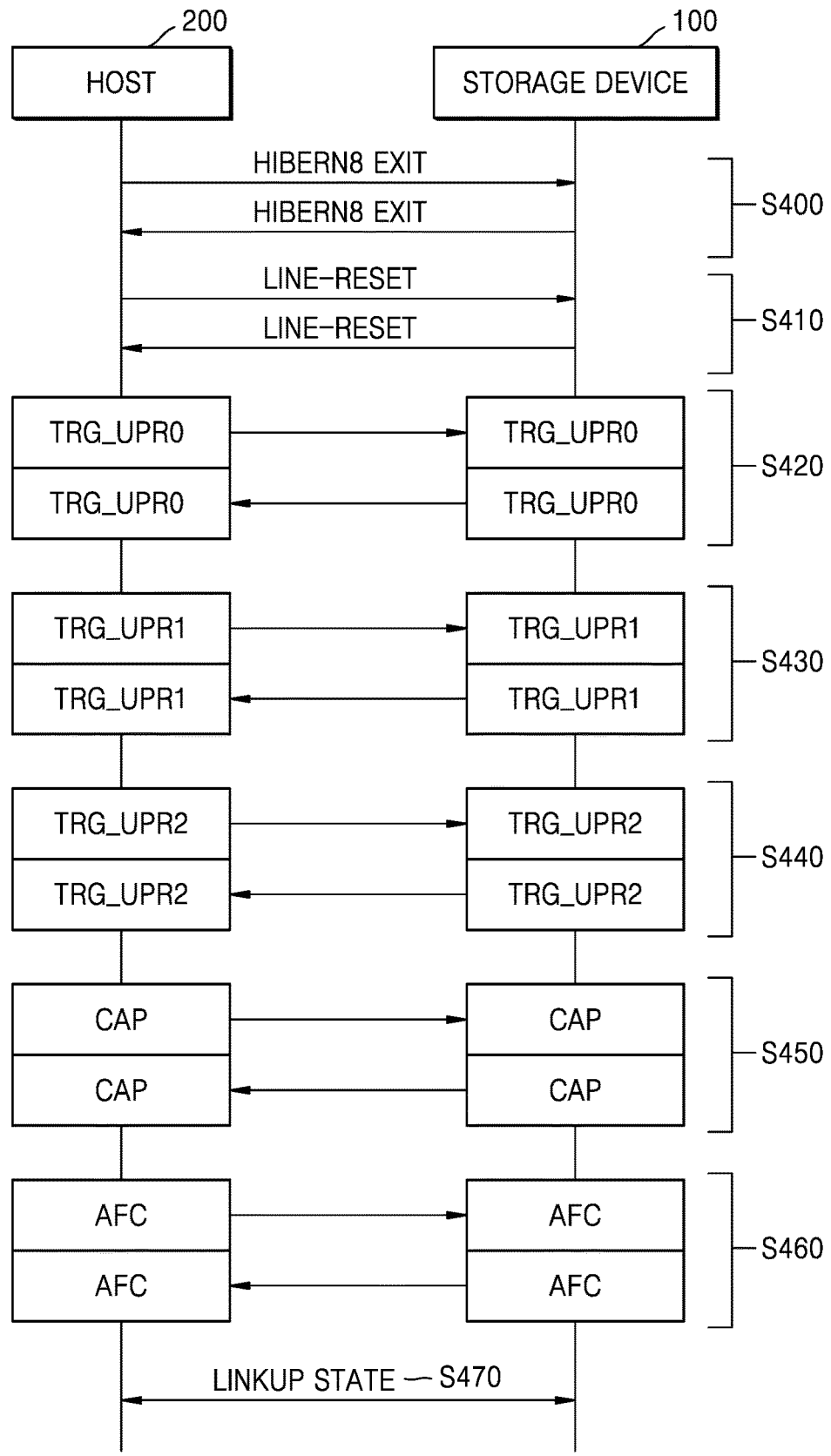
FIG. 19 is a flowchart of a link startup operation between a host and a storage device, according to an embodiment.

FIG. 19 is a flowchart of a link startup operation between the host 200 and the storage device 100, according to an embodiment. Referring to FIG. 19, the link startup operation according to the present embodiment may correspond to a modification of the link startup operation of FIG. 15, and redundant descriptions may be omitted. Operation S400 may correspond to exiting the hibernate state HIBERN8. In operation S400, the host 200 generates a signal (e.g., an activate signal) instructing the exit from a power saving mode (e.g., exit from the hibernate state HIBERN8), and transmits the generated signal to the storage device 100. Specifically, the host 200 may transition the line LINE to the DIF-N state and exit the hibernate state HIBERN8. In addition, in operation S400, the storage device 100 may transmit information indicating that it has exited from the hibernate state HIBERN8 to the host 200. Operations S410 to S470 may be performed according to the description given above with reference to FIG. 15, and redundant descriptions will be omitted.

Figure 20:
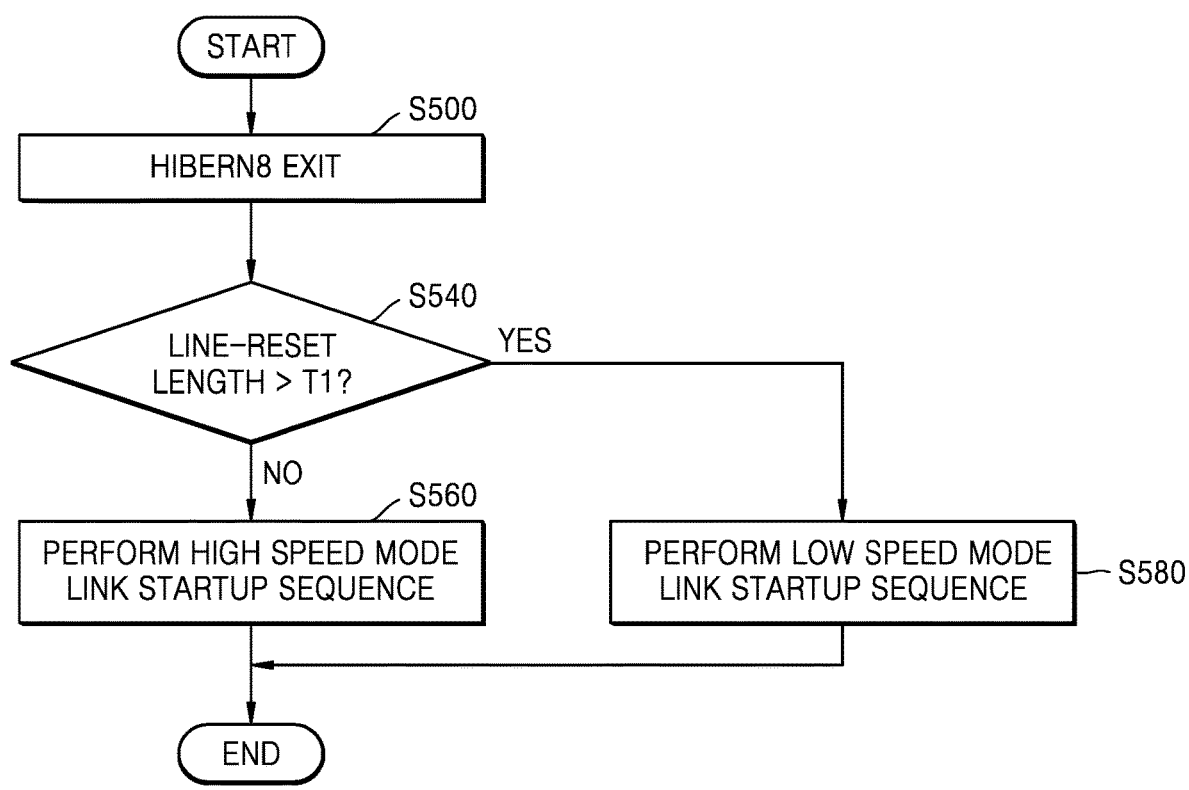
FIGS. 20 and 21 are flowcharts of link startup methods of storage devices, according to some embodiments.

FIG. 20 is a flowchart of a link startup method of a storage device, according to an embodiment.

Referring to FIGS. 1, 3 and 20, in operation S500, the storage device 100 exits the hibernate state HIBERN8. For example, when the differential line voltage DIF transitions from the DIF-Z state to the DIF-N state, the storage device 100 may determine that it has entered the activate period $T_{ACTIVATE}$ and exit the hibernate state HIBERN8. In operation S540, the storage device 100 determines whether the line-reset length is greater than the first reference time T1. As a result of the determination, when the line-reset length is not greater than the first reference time T1, the storage device 100 performs, in operation S560, a high-speed mode link startup sequence. On the other hand, when the line-reset length is greater than the first reference time T1, the storage device 100 performs a low-speed mode link startup sequence.

Figure 21:
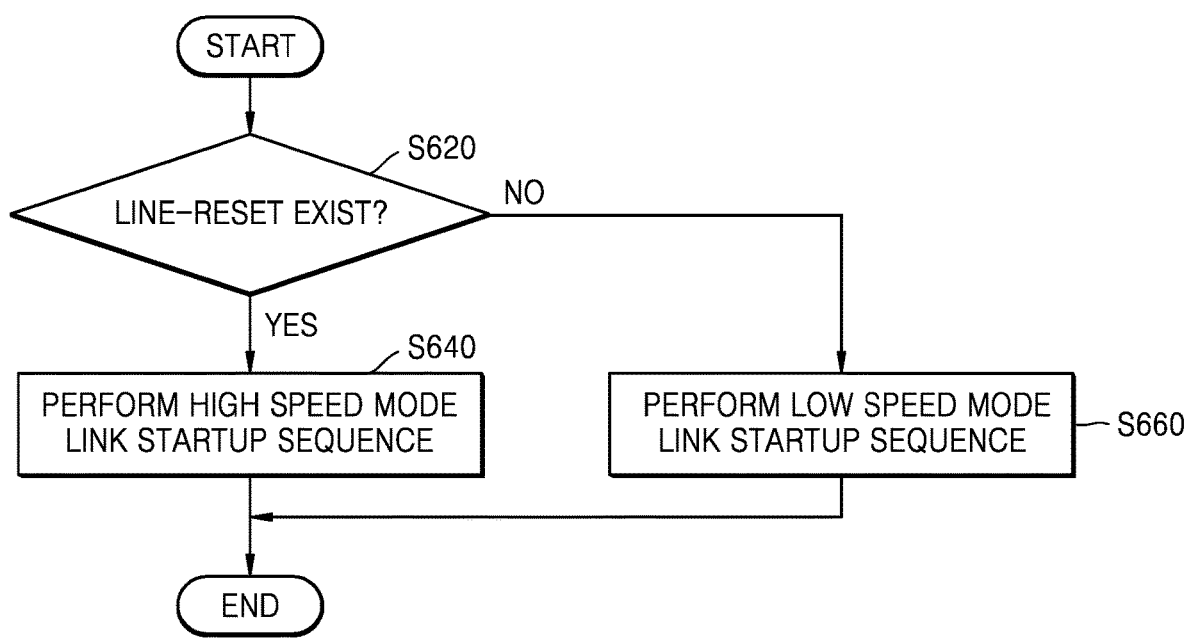

FIG. 21 is a flowchart of a link startup method of a storage device, according to an embodiment. Referring to FIG. 21, the link startup method of the storage device, according to the present embodiment, may correspond to an example implementation of the link startup method of FIG. 11, and may include operations that are performed in a time series in the storage device 100 of FIG. 1.

In operation S620, the storage device 100 determines whether there is a line-reset. Specifically, the storage device 100 determines whether a line-reset signal LINE-RESET is received from the host 200. In an embodiment, the storage device 100 may determine whether there is a line-reset period in which the line LINE has a positive differential line voltage. In an embodiment, the storage device 100 may determine whether the line LINE transitions from a negative differential line voltage to a positive differential line voltage. For example, the line-reset detector 140a of FIG. 6 may detect whether a line-reset signal LINE-RESET is received by using the system clock SYS_CLK. For example, the line-reset detector 140b of FIG. 8 and the line-reset detector 140c of FIG. 9 may detect whether a line-reset signal LINE-RESET is received by using an RC filter. For example, the line-reset detector 140a or 140b may detect a long DIF-P.

As a result of the determination, when there is a line-reset signal LINE-RESET, the storage device 100 performs, in operation S640, a high-speed mode link startup sequence. In this case, the storage device 100 may omit a line-reset operation. When there is no line-reset signal LINE-RESET, the storage device 100 performs a low-speed mode link startup sequence.

The various embodiments described above with reference to FIGS. 11 to 20 may also be applied to the present embodiment. In some embodiments, after operation S620, the storage device 100 may set the PL 111 or the LL 115 of the interconnect circuit 110 to perform a high-speed mode link startup operation or a low-speed mode link startup operation. In addition, in some embodiments, before operation S620, the storage device 100 may compare an activate period, in which the line LINE has a negative differential line voltage, with a reference time. When the activate period is less than the reference time, the storage device 100 may set the PL 111 or the LL 115 of the interconnect circuit 110. In addition, in some embodiments, before operation S620, the storage device 1 may exit the hibernate state HIBERN8, which is the power saving state.

Figure 22:
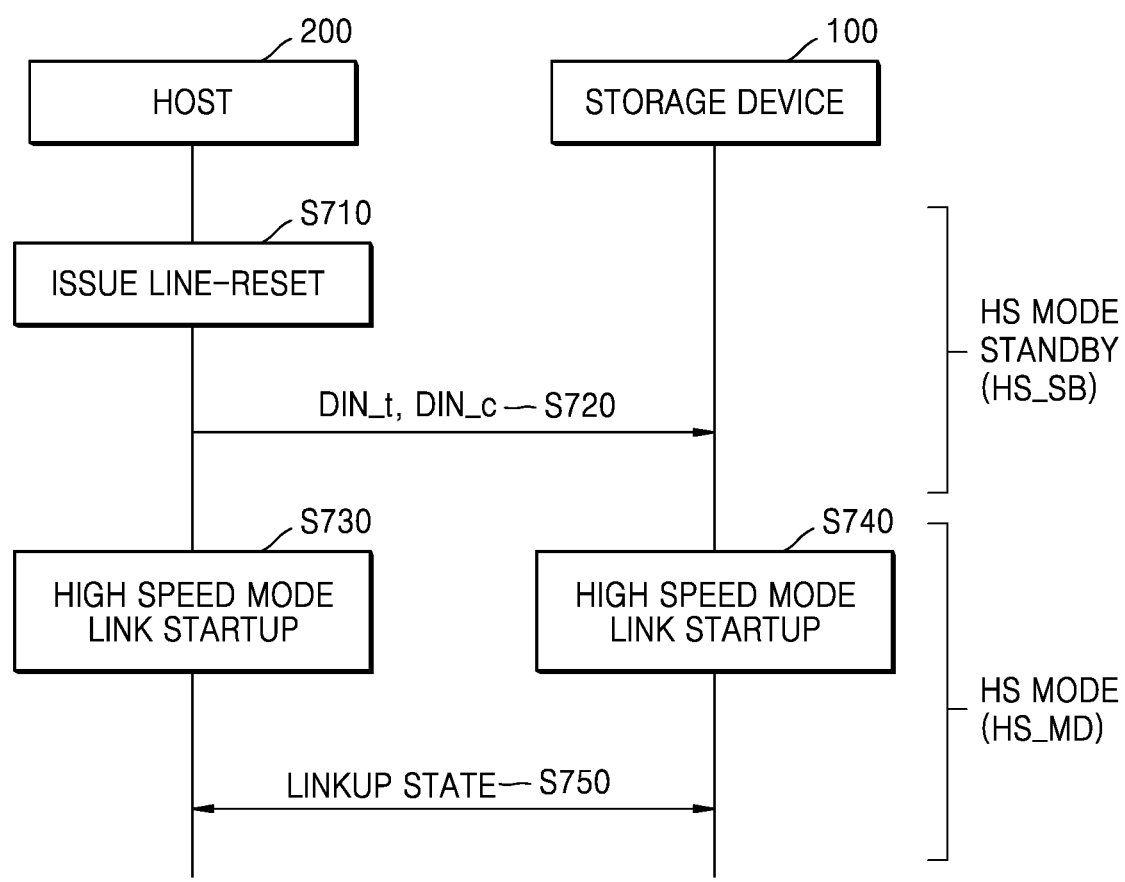
FIG. 22 is a flowchart of an operation between a host and a storage device, according to an embodiment.

FIG. 22 is a flowchart of an operation between the host 200 and the storage device 100, according to an embodiment.

Referring to FIG. 22, in operation S710, the host 200 generates a line-reset signal LINE-RESET. In operation S720, the host 200 transmits the line-reset signal LINE-RESET to the storage device 100 through differential input signal lines through which the positive input signal DIN_t and the negative input signal DIN_c are transmitted. Operations S710 and S720 may correspond to putting the storage device 100 into a high-speed mode standby HS_SB.

In operation S730, the host 200 performs a link startup operation in a high-speed mode. In operation S740, the storage device 100 performs a link startup operation in a high-speed mode. Operation S730 and operation S740 may be performed substantially at the same time. For example, operations S730 and S740 may correspond to operations S250 and S260 of FIG. 12, respectively. In operation S750, when the link startup operation is completed, a linkup state between the host 200 and the storage device 100 may be achieved and the host 200 and the storage device 100 may stably exchange data with each other (e.g., with the lanes/lines with which the link startup operation has been completed, such as the lane/line through which the positive input signal DIN_t and the negative input signal DIN_c were transmitted). Operations S730 to S750 may be performed in a high-speed mode HS_MD.

The various embodiments described above with reference to FIGS. 11 to 20 may also be applied to the present embodiment. In some embodiments, before operation S820, the storage device 100 may set the interconnect circuit 110 to perform a high-speed mode link startup operation. In addition, in some embodiments, before operation S880, the storage device 100 may set the interconnect circuit 110 to perform a low-speed mode link startup operation.

Figure 23:
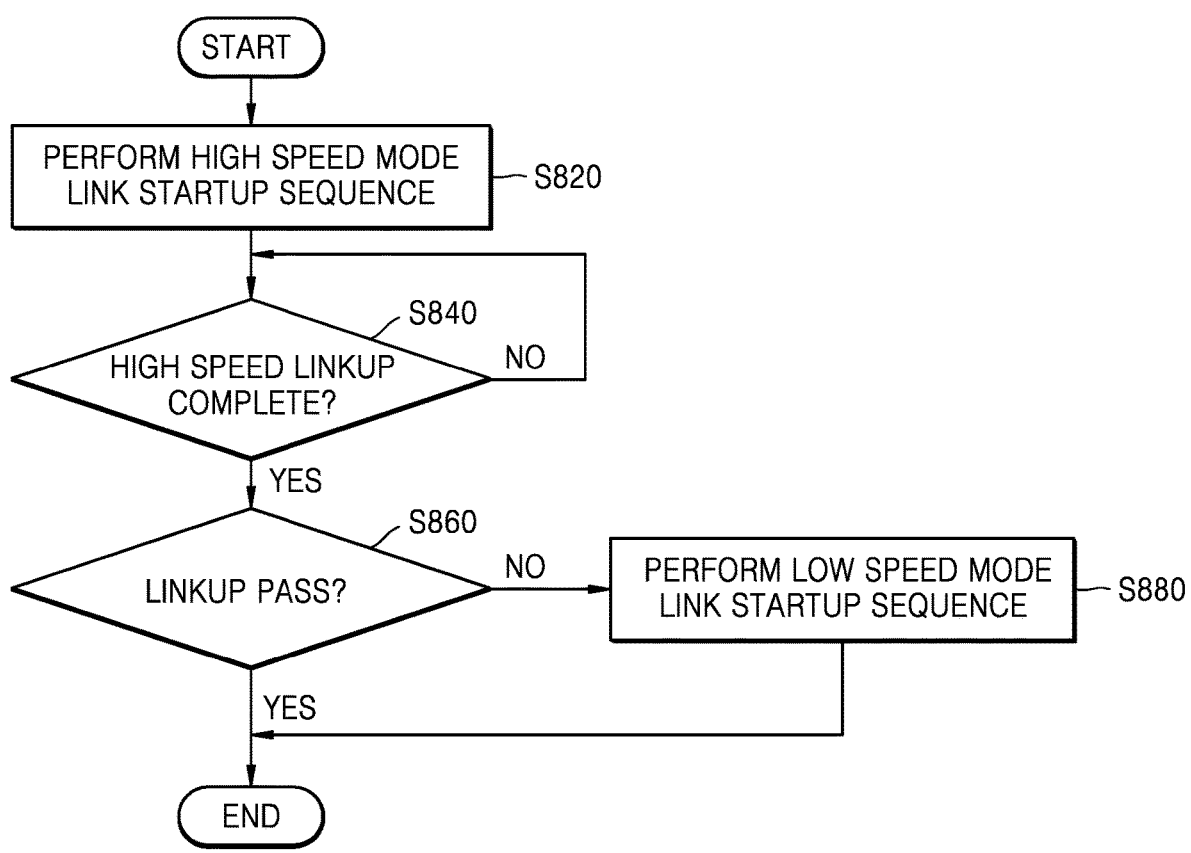
FIGS. 23 and 24 are flowcharts of link startup methods, according to some embodiments.

In addition, as represented in the method of FIG. 23, in some embodiments, in operation S820, a first trigger event of exchanging physical lane numbers of a transmission lane and a reception lane between the storage device 100 and the host 200, a second trigger event of exchanging information on the transmission lane and information on the reception lane between the storage device 100 and the host 200, and a third trigger event of exchanging logical lane information on the transmission lane and the reception lane between the storage device 100 and the host 200 may be performed. In addition, in some embodiments, in operation S820, after the third trigger event is performed, performance information may be exchanged and recognized between the storage device 100 and the host 200, and a control frame indicating that a transmitted initial data frame has been correctly received may be exchanged and recognized between the storage device 100 and the host 200.

FIG. 23 is a flowchart of a link startup method of a storage system, according to an embodiment. Referring to FIG. 23, the link startup method of the storage system, according to the present embodiment, may correspond to an example implementation of the link startup method of FIG. 11, and may include operations that are performed in a time series in the storage system 10 of FIG. 1.

In operation S820, a high-speed mode link startup sequence (operations to establish a linkup state by implementing a link startup operation in a high-speed mode, e.g., according to an embodiment described herein) is performed between the storage device 100 and the host 200. In operation S840, the storage device 100 or the host 200 determines whether the high-speed mode like startup sequence of S820 is completed. As a result of the determination, when the high-speed linkup operation is completed, the storage device 100 or the host 200 determines, in operation S860, whether the linkup is successful. As a result of the determination, when the linkup is successful, the link startup method ends. When the linkup is not successful, in operation S880, a low-speed mode link startup sequence (i.e., of the lane/line that failed the linkup) is performed between the storage device 100 and the host 200.

In an initial stage, because the host 200 does not know whether the storage device 100 supports a high-speed mode, the host 200 may preferentially perform the high-speed mode link startup sequence (as the default link startup sequence of the host 200) in S820. When the linkup is successful (e.g., a linkup state between the storage device 100 and host 200 is achieved) as a result of both the host 200 and the storage device 100 successfully performing the high-speed mode link startup sequence, the host 200 may determine that the storage device 100 is a device supporting the high-speed mode. On the other hand, when the linkup is not successful after performing the high-speed mode link startup sequence, the host 200 may determine that the storage device 100 is a device that does not support the high-speed mode, and both the host 200 and the storage device 100 may perform a low-speed mode link startup sequence to provide the linkup state between the storage device 100 and host 200.

As described above, according to the present embodiment, when power is applied to the storage system 10, the host 200 may first attempt to establish a linkup state with the storage device 100 by first performing a high-speed mode link startup sequence with the storage device 100. Accordingly, when the storage device 100 is a device supporting a high-speed mode, the storage device 100 may immediately perform a high-speed mode link startup sequence without performing an operation such as detecting whether there is a line-reset or detecting a line-reset length, and thus may further reduce a time required for link startup processing.

Figure 24:
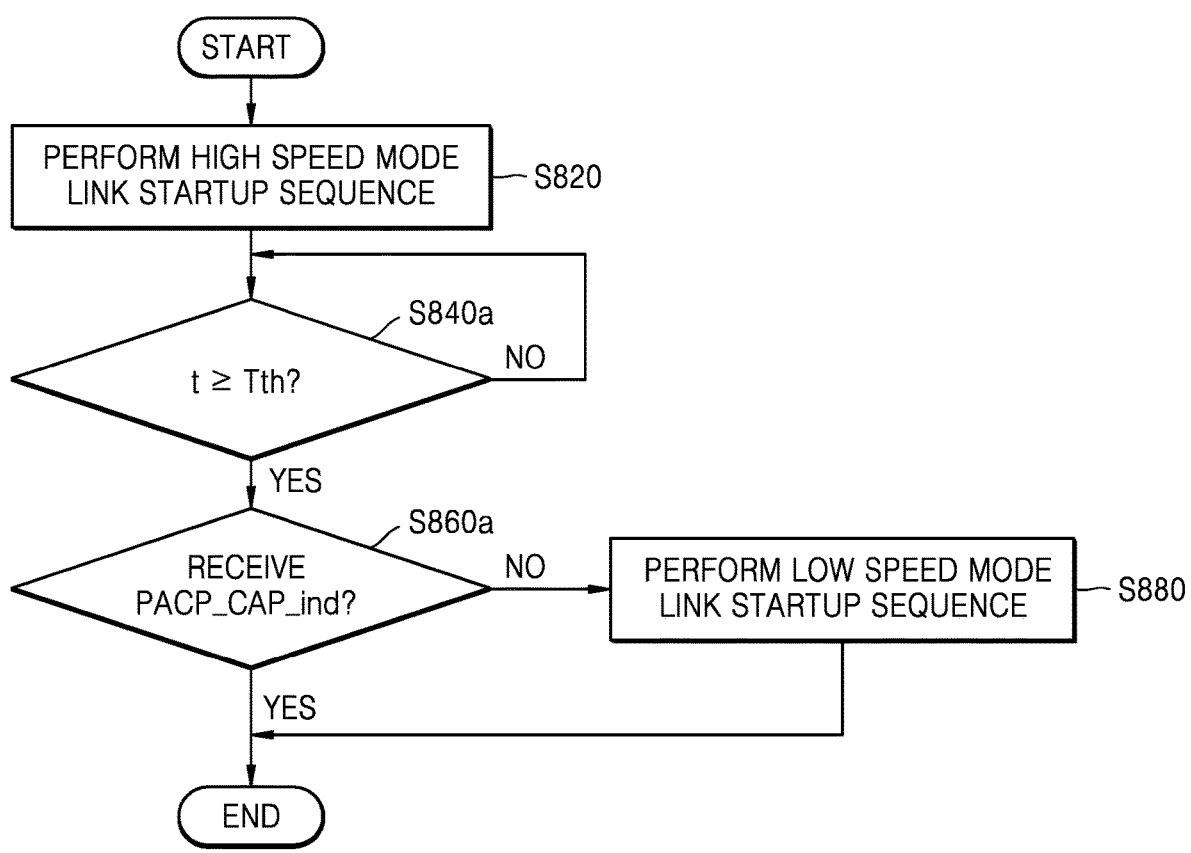

FIG. 24 is a flowchart of a link startup method of a storage system according to an embodiment. Referring to FIG. 24, the link startup method of the storage system according to the present embodiment, may correspond to an example implementation of the link startup method of FIG. 23, and may include operations that are performed in a time series in the storage system 10 of FIG. 1.

In operation S820, a high-speed mode link startup sequence is performed between the storage device 100 and the host 200. In operation S840a, the storage device 100 or the host 200 determines whether an execution time t of the high-speed mode link startup sequence has exceeded a predetermined threshold time Tth. Specifically, the storage device 100 may determine whether the threshold time Tth has elapsed after the initiation of the high-speed mode link startup sequence. The threshold time Tth may be defined as a link timeout value. For example, the threshold time Tth may be about 10 ms.

When the execution time t has exceeded the threshold time Tth, the host 200 determines, in operation S840a, whether performance information (e.g., PACP_CAP_ind) has been received from the storage device 100. When the host 200 has received the performance information from the storage device 100, the host 200 may determine that the linkup has been successful. When the host 200 does not receive performance information from the storage device 100, the host 200 may determine that the linkup has not been successful. Alternately, when the execution time t has exceeded the threshold time Tth, the storage device 100 determines, in operation S840a, whether performance information (e.g., PACP_CAP_ind) has been received from the host 200. When the storage device 100 has received the performance information from the host 200, the storage device 100 may determine that the linkup has been successful. When the storage device 100 does not receive performance information from the host 200, the storage device 100 may determine that the linkup has not been successful. When the linkup is determined as unsuccessful, in operation S880, a low-speed mode link startup sequence is performed between the storage device 100 and the host 200.

Figure 25:
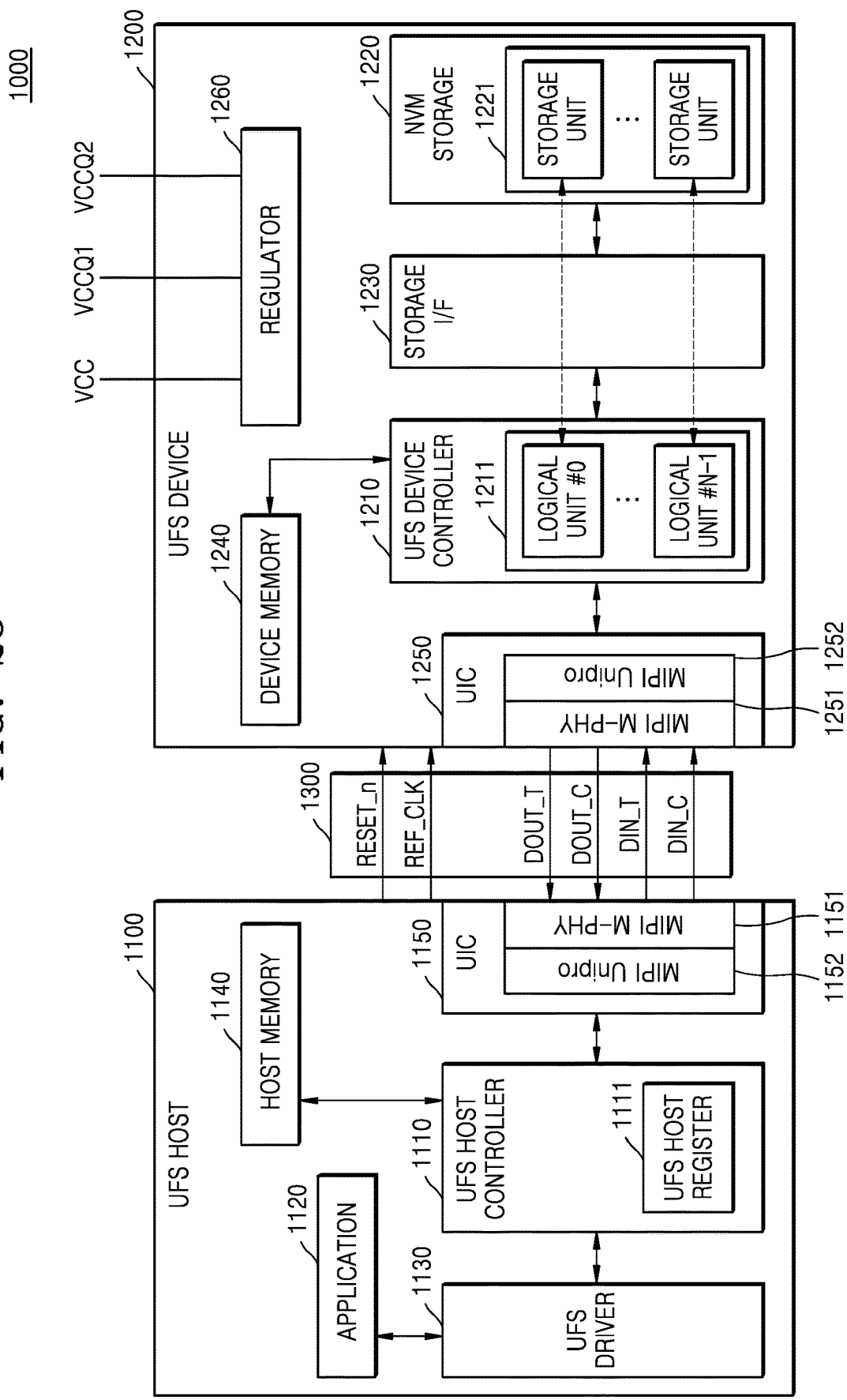
FIG. 25 is a diagram of a UFS system according to an embodiment.

FIG. 25 is a diagram of a UFS system 1000 according to an embodiment. The UFS system 1000 complies with the UFS standards published by the Joint Electron Device Engineering Council (JEDEC) and may include a UFS host 1100, a UFS device 1200, and a UFS interface 1300. The descriptions above about the storage systems 10 and 10A of FIGS. 1 and 5 may also apply to the UFS system 1000 of FIG. 25, unless the above descriptions contradict the descriptions below with reference to FIG. 25.

Referring to FIG. 25, the UFS host 1100 and the UFS device 1200 may be connected to each other through the UFS interface 1300. When the host 200 in FIG. 1 is an AP, the UFS host 1100 may be implemented as a part of the AP. A UFS host controller 1110 may correspond to the host controller 220 in FIG. 1. The UFS device 1200 may correspond to the storage device 100 in FIG. 1, and a UFS device controller 1210 and an NVM storage 1220 may respectively correspond to the device controller 120 and the NVM 130 in FIG. 1.

The UFS host 1100 may include the UFS host controller 1110, an application 1120, a UFS driver 1130, a host memory 1140, and a UFS interconnect (UIC) layer 1150. The UFS device 1200 may include the UFS device controller 1210, the NVM storage 1220, a storage interface 1230, a device memory 1240, a UIC layer 1250, and a regulator 1260. The NVM storage 1220 may include a plurality of storage units 1221. The storage units 1221 may include vertical NAND (VNAND) flash memory in a two-dimensional (2D) or three-dimensional (3D) structure or other kinds of NVM such as PRAM and/or RRAM. The UFS device controller 1210 and the NVM storage 1220 may be connected to each other through the storage interface 1230. The storage interface 1230 may be implemented to comply with a standard protocol such as Toggle or ONFI.

The application 1120 may refer to a program for communicating with the UFS device 1200 to use a function of the UFS device 1200. The application 1120 may transmit an input-output request (IOR) for input/output of the UFS device 1200 to the UFS driver 1130. The IOR may include a data read request, a data write request, and/or a data discard request but is not limited thereto.

The UFS driver 1130 may manage the UFS host controller 1110 through a UFS-host controller interface (HCI). The UFS driver 1130 may convert an IOR, which is generated by the application 1120, into a UFS command defined by a UFS standard and may transmit the UFS command to the UFS host controller 1110. A single IOR may be converted into a plurality of UFS commands. A UFS command may be a command that is defined by the small computer small interface (SCSI) standard or an exclusive command for the UFS standard.

The UFS host controller 1110 may transmit the UFS command from the UFS driver 1130 to the UIC layer 1250 of the UFS device 1200 through the UIC layer 1150 and the UFS interface 1300. In this process, a UFS host register of the UFS host controller 1110 may function as and provide a command queue.

The UIC layer 1150 of the UFS host 1100 may include a MIPI M-PHY 1151 and a MIPI UniPro 1152, and the UIC layer 1250 of the UFS device 1200 may also include a MIPI M-PHY 1251 and a MIPI UniPro 1252.

The UFS interface 1300 may include a line transmitting the reference clock signal REF_CLK, a line transmitting a hardware reset signal RESET_n for the UFS device 1200, a pair of conductive wires transmitting a pair of complementary input signals DIN_T and DIN_C, and a pair of conductive wires transmitting a pair of complementary output signals DOUT_T and DOUT_C.

The frequency value of the reference clock signal REF_CLK provided from the UFS host 1100 to the UFS device 1200 may be one of 19.2 MHz, 26 MHz, 38.4 MHz, and 52 MHz but is not limited thereto. The UFS host 1100 may change the frequency value of the reference clock signal REF_CLK even while operating or exchanging data with the UFS device 1200. The UFS device 1200 may generate clock signals having different frequencies from the reference clock signal REF_CLK, which is received from the UFS host 1100, by using a phase-locked loop (PLL) or the like. The UFS host 1100 may set a value of a data rate between the UFS host 1100 and the UFS device 1200 using the frequency value of the reference clock signal REF_CLK. In other words, the value of the data rate may be determined depending on the frequency value of the reference clock signal REF_CLK.

The UFS interface 1300 may support multiple lanes, and each of the lanes may be implemented as a differential pair. For example, the UFS interface 1300 may include at least one receive lane and at least one transmit lane. In FIG. 25, a pair of wires transmitting the pair of complementary input signals DIN_T and DIN_C may form a receive lane, and a pair of wires transmitting the pair of complementary output signals DOUT_T and DOUT_C may form a transmit lane. Although one transmit lane and one receive lane are illustrated in FIG. 25, the numbers of transmit lanes and receive lanes may be changed.

A receive lane and a transmit lane may transmit data in a serial communication mode. Because the receive lane is separated from the transmit lane, the UFS host 1100 may communicate with the UFS device 1200 in a full-duplex mode. In other words, the UFS device 1200 may transmit data to the UFS host 1100 through the transmit lane even while receiving data from the UFS host 1100 through the receive lane. Control data such as a command from the UFS host 1100 to the UFS device 1200 may be transmitted through the same lane as user data, which the UFS host 1100 writes to or reads from the NVM storage 1220 of the UFS device 1200. Accordingly, other lanes for data transmission than a pair of a receive lane and a transmit lane are not necessary between the UFS host 1100 and the UFS device 1200.

The UFS device controller 1210 of the UFS device 1200 may generally control operations of the UFS device 1200. The UFS device controller 1210 may manage the NVM storage 1220 by using a logical unit 1211 corresponding to a logical data storage unit. The number of logical units 1211 may be eight but is not limited thereto. The UFS device controller 1210 may include a flash translation layer (FTL) and may translate a logical address data, e.g., a logical block address (LBA), received from the UFS host 1100 into a physical data address, e.g., a physical block address (PBA), using address mapping information of the FTL. A logical block for storing user data in the UFS system 1000 may have a size in a certain range. For example, a minimum size of a logical block may be set to 4 Kbytes.

When a command from the UFS host 1100 is input to the UFS device 1200 through the UIC layer 1250, the UFS device controller 1210 may perform an operation corresponding to the command and transmit a completion response to the UFS host 1100 after the operation is completed.

For example, when the UFS host 1100 writes user data in the UFS device 1200, the UFS host 1100 may transmit a data write command to the UFS device 1200. When the UFS host 1100 receives a response corresponding to ready-to-transfer from the UFS device 1200, the UFS host 1100 may transmit the user data to the UFS device 1200. The UFS device controller 1210 may temporarily store the user data in the device memory 1240 and write the user data temporarily stored in the device memory 1240 to a selected position of the NVM storage 1220.

In another example, when the UFS host 1100 reads user data from the UFS device 1200, the UFS host 1100 may transmit a data read command to the UFS device 1200. The UFS device controller 1210 may receive the data read command, read the user data from the NVM storage 1220 based on the data read command, and temporarily store the user data, which has been read, in the device memory 1240. In the read operation, the UFS device controller 1210 may detect and correct an error in the user data, which has been read, by using an embedded error correction code (ECC) engine (not shown). In detail, the ECC engine may generate parity bits with respect to data to be written to the NVM storage 1220, and the parity bits may be stored in the NVM storage 1220 together with the data. When data is read from the NVM storage 1220, the ECC engine may correct an error in the data using parity bits, which are read from the NVM storage 1220 together with the data, and may output error-corrected read data.

The UFS device controller 1210 may transmit the user data, which has been temporarily stored in the device memory 1240, to the UFS host 1100. The UFS device controller 1210 may further include an advanced encryption standard (AES) engine (not shown). The AES engine may perform at least one selected from encryption and decryption of data input to the UFS device controller 1210 by using a symmetric-key algorithm.

The UFS host 1100 may store commands to be transmitted to the UFS device 1200 in the UFS host register 1111, which may function as a command queue, in an order and transmit the commands to the UFS device 1200 in the order. At this time, even while a command transmitted to the UFS device 1200 is being processed by the UFS device 1200, i.e., even before the UFS host 1100 is notified that a command transmitted to the UFS device 1200 has been completely processed by the UFS device 1200, the UFS host 1100 may transmit a subsequent command in the command queue to the UFS device 1200, and the UFS device 1200 may receive the subsequent command from the UFS host 1100 even while processing the command received before. A queue depth, i.e., the maximum number of commands that may be stored in the command queue, may be 32. The command queue may be a circular queue, in which a head pointer and a tail pointer respectively indicate the beginning and end of a command sequence stored therein.

Each of the storage units 1221 may include a memory cell array (not shown) and a control circuit (not shown), which controls the operation of the memory cell array. The memory cell array may include a 2D memory cell array or a 3D memory cell array. The memory cell array includes a plurality of memory cells. Each of the memory cells may be configured as a single-level cell (SLC) storing one bit of information or a cell, or a multi-level cell (MLC) that stores at least two bits of information (which may be a triple-level cell (TLC), or a quadruple-level cell (QLC)). A 3D memory cell array may include a vertically-oriented NAND string, in which at least one memory cell is arranged above another memory cell.

Supply voltages VCC, VCCQ, and VCCQ2 may be input to the UFS device 1200. The supply voltage VCC may be a main supply voltage for the UFS device 1200 and may have a value of about 2.4 V to about 3.6 V. The supply voltage VCCQ may be used to supply a voltage in a low range and be mainly used for the UFS device controller 1210. The supply voltage VCCQ may have a value of about 1.14 V to about 1.26 V. The supply voltage VCCQ2 may be used to supply a voltage that is less than the supply voltage VCC and higher than the supply voltage VCCQ and be mainly used for an input/output interface such as the MIPI M-PHY 1251. The supply voltage VCCQ2 may have a value of about 1.7 V to about 1.95 V. Each of the supply voltages VCC, VCCQ, and VCCQ2 may be supplied to a corresponding element of the UFS device 1200 through the regulator 1260. The regulator 1260 may be implemented as a group of regulator units respectively connected to the supply voltages VCC, VCCQ, and VCCQ2.

Figure 26A:
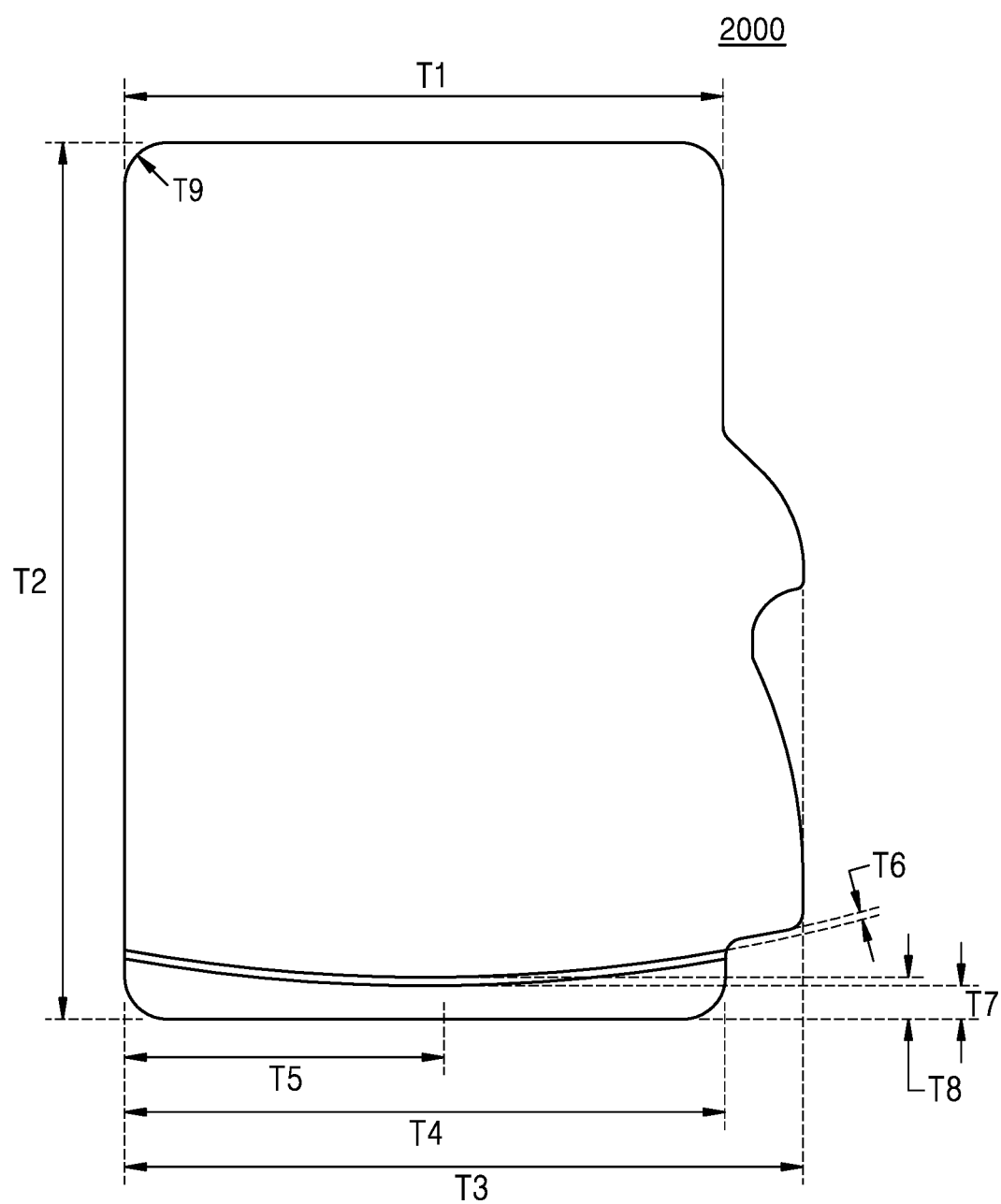
FIGS. 26A to 26C are diagrams for describing a form factor of a UFS card.
Figure 26B:
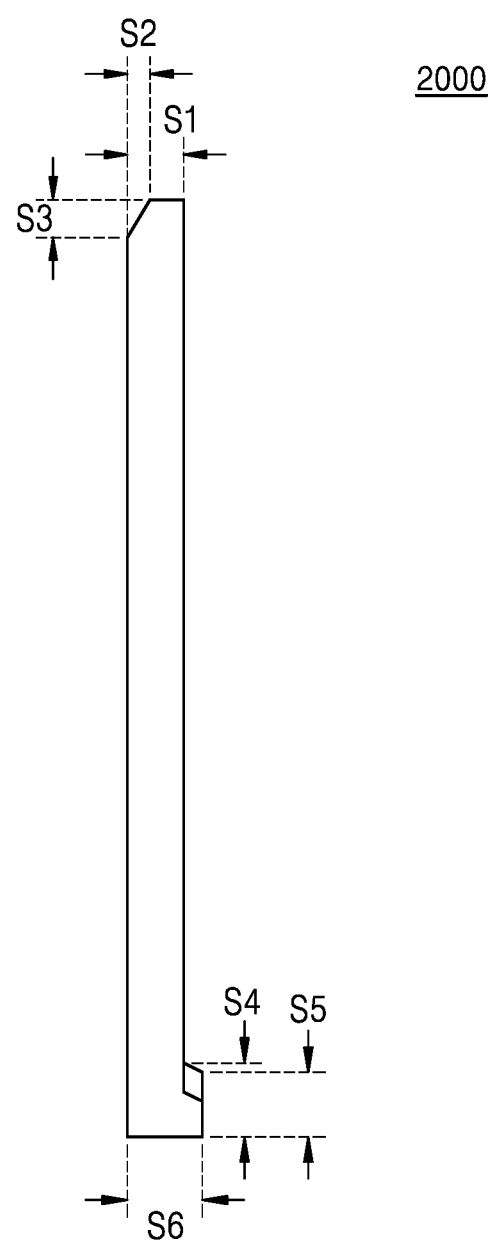
Figure 26C:
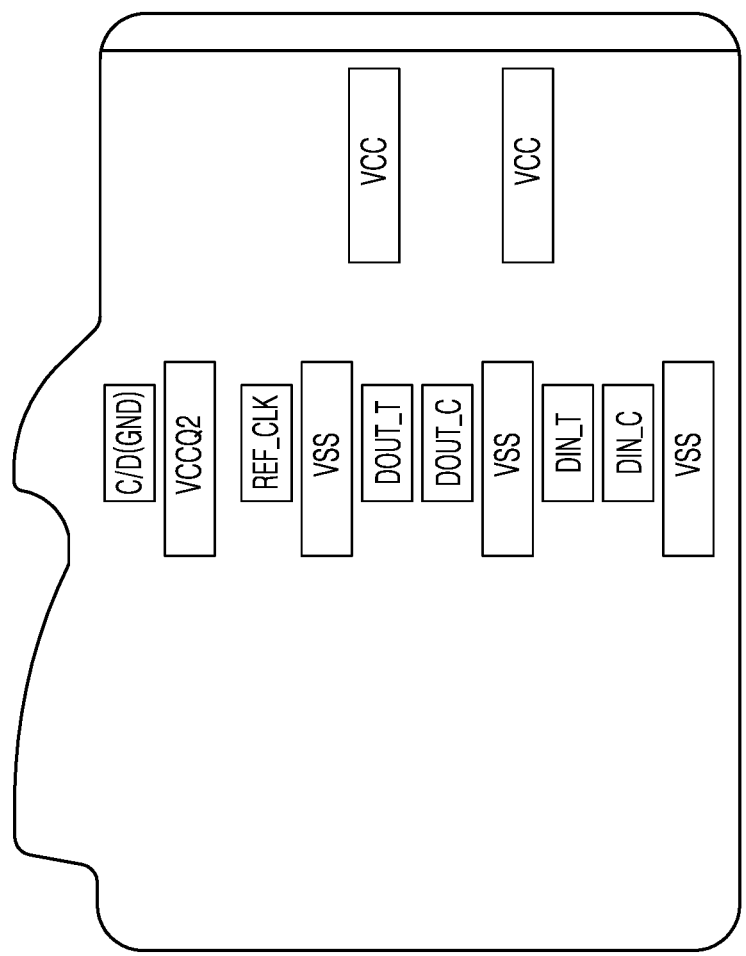

FIGS. 26A to 26C are diagrams for describing a form factor of a UFS card. When the UFS device 1200 described with reference to FIG. 25 is implemented in a form of a UFS card 2000, the outer shape of the UFS card 2000 may be as shown in FIGS. 26A through 26C.

FIG. 26A illustrates a top view of the UFS card 2000. Referring to FIG. 26A, it may be seen that the UFS card 2000 generally conforms to a shark design (e.g., with a protrusion having a shark fin shape (right side of FIG. 26A) to facilitate a grip with a finger or thumb by a user). In relation to FIG. 26A, the UFS card 2000 may have dimensions shown in Table 1.

TABLE 1

| Item | Dimension (mm) |
|---|---|
| T1 | 9.70 |
| T2 | 15.00 |
| T3 | 11.00 |
| T4 | 9.70 |
| T5 | 5.15 |
| T6 | 0.25 |
| T7 | 0.60 |

TABLE 1-continued

| Item | Dimension (mm) |
|---|---|
| T8 | 0.75 |
| T9 | R0.80 |

FIG. 26B illustrates a side view of the UFS card 2000. In relation to FIG. 25B, the UFS card 2000 may have dimensions shown in Table 2.

TABLE 2

| Item | Dimension (mm) |
|---|---|
| S1 | 0.74 ± 0.06 |
| S2 | 0.30 |
| S3 | 0.52 |
| S4 | 1.20 |
| S5 | 0.05 |
| S6 | 1.00 |

FIG. 26C illustrates a bottom view of the UFS card 2000. Referring to FIG. 26C, a plurality of pins electrically connected to a UFS slot may be formed in the bottom of the UFS card 2000, and the function of each pin will be described below. Based on the symmetry between the top and the bottom of the UFS card 2000, some (e.g., T1 through T5 and T9) of the details about the dimensions described with reference to FIG. 26A and Table 1 may also apply to the bottom view of the UFS card 2000 of FIG. 26C.

A plurality of pins electrically connected to a UFS host may be formed in the bottom of the UFS card 2000, and the total number of pins may be 12 according to FIG. 26C. Each of the pins may have a rectangular shape, and a signal name corresponding to each pin is shown in FIG. 26C. Table 3 may be referred to for general information about each pin.

TABLE 3

| No. | Signal name | Description | Dimension (mm) |
|---|---|---|---|
| 1 | VSS | Ground (GND) | 3.00 × 0.72 ± 0.05 |
| 2 | DIN_C | Complementary input signals input from a | 1.50 × 0.72 ± 0.05 |
| 3 | DIN_T | host to the UFS card 2000 (DIN_C is a negative node and DIN_T is a positive node) | |
| 4 | VSS | Same as No. 1 | 3.00 × 0.72 ± 0.05 |
| 5 | DOUT_C | Complementary output signals output from | 1.50 × 0.72 ± 0.05 |
| 6 | DOUT_T | the UFS card 2000 to the host (DOUT_C is a negative node and DOUT_T is a positive node) | |
| 7 | VSS | Same as No. 1 | 3.00 × 0.72 ± 0.05 |
| 8 | REF_CLK | Reference clock signal provided from the host to the UFS card 2000 | 1.50 × 0.72 ± 0.05 |
| 9 | VCCQ2 | Supply voltage provided mainly for a PHY interface or a controller and having a lower value than VCC. | 3.00 × 0.72 ± 0.05 |
| 10 | C/D(GND) | Signal for card detection | 1.50 × 0.72 ± 0.05 |
| 11 | VSS | Same as No. 1 | 3.00 × 0.80 ± 0.05 |
| 12 | VCC | Main supply voltage | |

Figure 27:
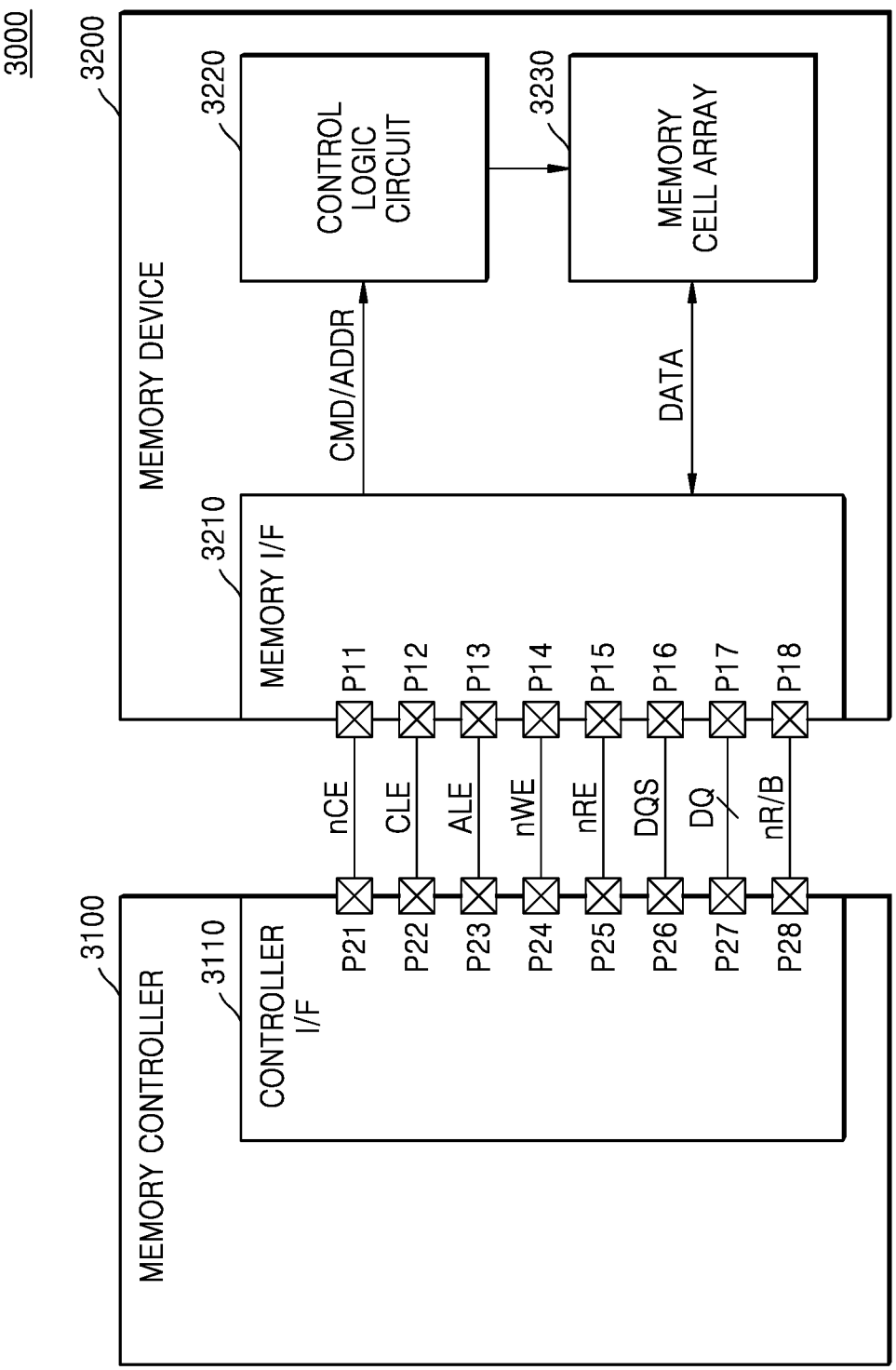
FIG. 27 is a block diagram of a memory system according to an embodiment.

FIG. 27 is a block diagram of a memory system 3000 according to an embodiment.

Referring to FIG. 27, the memory system 3000 may include a memory device 3200 and a memory controller 3100. The memory device 3200 may correspond to an NVM device, which communicates with the memory controller 3100 based on one of a plurality of channels. For example, the memory device 3200 may correspond to the NVM 130 in FIG. 1, and the memory controller 3100 may correspond to the device controller 120 in FIG. 1. The memory controller 3100 and memory device 3200 may each be embodied as a single semiconductor chip with the pins (described below) corresponding to chip pads of these semiconductor chips. It should be appreciated that the NVM 130 may be formed as a single semiconductor chip (e.g., as memory device 3200 when embodied as a single semiconductor chip), NVM 130 may also be formed as a plurality of semiconductor chips (e.g., as a stack of memory chips in a semiconductor package that may also include the memory controller 3100 (e.g., when embodied as a single semiconductor chip)).

The memory device 3200 may include first through eighth pins P11 through P18, a memory interface circuit 3210, a control logic circuit 3220, and a memory cell array 3230. The memory interface circuit 3210 may receive a chip enable signal nCE from the memory controller 3100 through the first pin P11. The memory interface circuit 3210 may exchange signals with the memory controller 3100 through the second through eighth pins P12 through P18 according to the chip enable signal nCE. For example, when the chip enable signal nCE is enabled (e.g., at a low level), the memory interface circuit 3210 may exchange signals with the memory controller 3100 through the second through eighth pins P12 through P18 according to the chip enable signal nCE.

The memory interface circuit 3210 may receive a command latch enable signal CLE, an address latch enable signal ALE, and a write enable signal nWE from the memory controller 3100 through the second through fourth pins P12 through P14, respectively. The memory interface circuit 3210 may receive or transmit a data signal DQ from or to the memory controller 3100 through the seventh pin P17. The command CMD, an address ADDR, and data DATA may be transmitted through the data signal DQ. For example, the data signal DQ may be transmitted through a plurality of data signal lines. In this case, the seventh pin P17 may include a plurality of pins respectively corresponding to the data signal lines.

The memory interface circuit 3210 may acquire the command CMD from the data signal DQ, which is received in an enable period (e.g., a high-level state) of the command latch enable signal CLE, based on toggle timings of the write enable signal nWE. The memory interface circuit 3210 may acquire the address ADDR from the data signal DQ, which is received in an enable period (e.g., a high-level state) of the address latch enable signal ALE, based on the toggle timings of the write enable signal nWE.

In an example embodiment, the write enable signal nWE may remain in a static state (e.g., a high level or a low level) and toggle between the high level and the low level. For example, the write enable signal nWE may toggle in a period in which the command CMD or the address ADDR is transmitted. Accordingly, the memory interface circuit 3210 may acquire the command CMD or the address ADDR based on the toggle timings of the write enable signal nWE.

The memory interface circuit 3210 may receive a read enable signal nRE from the memory controller 3100 through the fifth pin P15. The memory interface circuit 3210 may receive or transmit a data strobe signal DQS from or to the memory controller 3100 through the sixth pin P16.

In a data output operation of the memory device 3200, the memory interface circuit 3210 may receive the read enable signal nRE, which toggles, through the fifth pin P15 before outputting the data DATA. The memory interface circuit 3210 may generate the data strobe signal DQS, which toggles, based on toggling of the read enable signal nRE. For example, the memory interface circuit 3210 may generate the data strobe signal DQS, which starts toggling after a certain delay (e.g., tDQSRE) from a toggling start time of the read enable signal nRE. The memory interface circuit 3210 may transmit the data signal DQ including the data DATA based on toggle timings of the data strobe signal DQS. Accordingly, the data DATA may be transmitted to the memory controller 3100 in synchronization with the toggle timings of the data strobe signal DQS.

In a data input operation of the memory device 3200, when the data signal DQ including the data DATA is received from the memory controller 3100, the memory interface circuit 3210 may receive the data strobe signal DQS, which toggles, from the memory controller 3100 together with the data DATA. The memory interface circuit 3210 may acquire the data DATA from the data signal DQ based on the toggle timings of the data strobe signal DQS. For example, the memory interface circuit 3210 may acquire the data DATA by sampling the data signal DQ at rising and falling edges of the data strobe signal DQS.

The memory interface circuit 3210 may transmit a ready/busy output signal nR/B to the memory controller 3100 through the eighth pin P18. The memory interface circuit 3210 may transmit state information of the memory device 3200 to the memory controller 3100 through the ready/busy output signal nR/B. When the memory device 3200 is in a busy state (that is, when internal operations of the memory device 3200 are being performed), the memory interface circuit 3210 may transmit the ready/busy output signal nR/B indicating the busy state to the memory controller 3100. When the memory device 3200 is in a ready state (that is, when internal operations of the memory device 3200 are not performed or are completed), the memory interface circuit 3210 may transmit the ready/busy output signal nR/B indicating the ready state to the memory controller 3100. For example, while the memory device 3200 is reading the data DATA from the memory cell array 3230 in response to a read command, the memory interface circuit 3210 may transmit the ready/busy output signal nR/B indicating the busy state (e.g., a low level) to the memory controller 3100. For example, while the memory device 3200 is programming the data DATA to the memory cell array 3230 in response to a program command, the memory interface circuit 3210 may transmit the ready/busy output signal nR/B indicating the busy state to the memory controller 3100.

The control logic circuit 3220 may generally control various operations of the memory device 3200. The control logic circuit 3220 may receive the command CMD and/or the address ADDR from the memory interface circuit 3210. The control logic circuit 3220 may generate control signals for controlling other elements of the memory device 3200 according to the command CMD and/or the address ADDR. For example, the control logic circuit 3220 may generate various control signals for programming the data DATA to the memory cell array 3230 or reading the data DATA from the memory cell array 3230.

The memory cell array 3230 may store the data DATA from the memory interface circuit 3210 under the control of the control logic circuit 3220. The memory cell array 3230 may output the data DATA, which has been stored therein, to the memory interface circuit 3210 under the control of the control logic circuit 3220.

The memory cell array 3230 may include a plurality of memory cells. For example, the memory cells may include flash memory cells. However, embodiments are not limited thereto. The memory cells may include RRAM cells, ferroelectric RAM (FRAM) cells, PRAM cells, thyristor RAM (TRAM) cells, or MRAM cells. Hereinafter, embodiments will be described focusing on the case where the memory cells include NAND flash memory cells.

The memory controller 3100 may include first through eighth pins P21 through P28 and a controller interface circuit 3110. The first through eighth pins P21 through P28 may respectively correspond to the first through eighth pins P11 through P18 of the memory device 3200. The controller interface circuit 3110 may transmit the chip enable signal nCE to the memory device 3200 through the first pin P21. The controller interface circuit 3110 may exchange signals with the memory device 3200 through the second through eighth pins P22 through P28 according to the chip enable signal nCE.

The controller interface circuit 3110 may transmit the command latch enable signal CLE, the address latch enable signal ALE, and the write enable signal nWE to the memory device 3200 through the second through fourth pins P22 through P24, respectively. The controller interface circuit 3110 may transmit or receive the data signal DQ to or from the memory device 3200 through the seventh pin P27.

The controller interface circuit 3110 may transmit the data signal DQ, which includes the command CMD or the address ADDR, to the memory device 3200 together with the write enable signal nWE, which toggles. The controller interface circuit 3110 may transmit the data signal DQ including the command CMD to the memory device 3200 by transmitting the command latch enable signal CLE, which is in the enable state, and transmit the data signal DQ including the address ADDR to the memory device 3200 by transmitting the address latch enable signal ALE, which is in the enable state.

The controller interface circuit 3110 may transmit the read enable signal nRE to the memory device 3200 through the fifth pin P25. The controller interface circuit 3110 may receive or transmit the data strobe signal DQS from or to the memory device 3200 through the sixth pin P26.

In a data output operation of the memory device 3200, the controller interface circuit 3110 may generate and transmit the read enable signal nRE, which toggles, to the memory device 3200. For example, before the output of the data DATA, the controller interface circuit 3110 may generate the read enable signal nRE, which is converted from a static state (e.g., a high level or a low level) into a toggling state. Accordingly, the memory device 3200 may generate the data strobe signal DQS, which toggles, based on the read enable signal nRE. The controller interface circuit 3110 may receive the data signal DQ including the data DATA and the data strobe signal DQS, which toggles, from the memory device 3200. The controller interface circuit 3110 may acquire the data DATA from the data signal DQ based on the toggle timings of the data strobe signal DQS.

In a data input operation of the memory device 3200, the controller interface circuit 3110 may generate the data strobe signal DQS, which toggles. For example, before transmitting the data DATA, the controller interface circuit 3110 may generate the data strobe signal DQS, which is converted from a static state (e.g., a high level or a low level) into a toggling state. The controller interface circuit 3110 may transmit the data signal DQ including the data DATA to the memory device 3200 based on the toggle timings of the data strobe signal DQS.

The controller interface circuit 3110 may receive the ready/busy output signal nR/B from the memory device 3200 through the eighth pin P28. The controller interface circuit 3110 may determine state information of the memory device 3200 based on the ready/busy output signal nR/B.

Figure 28:
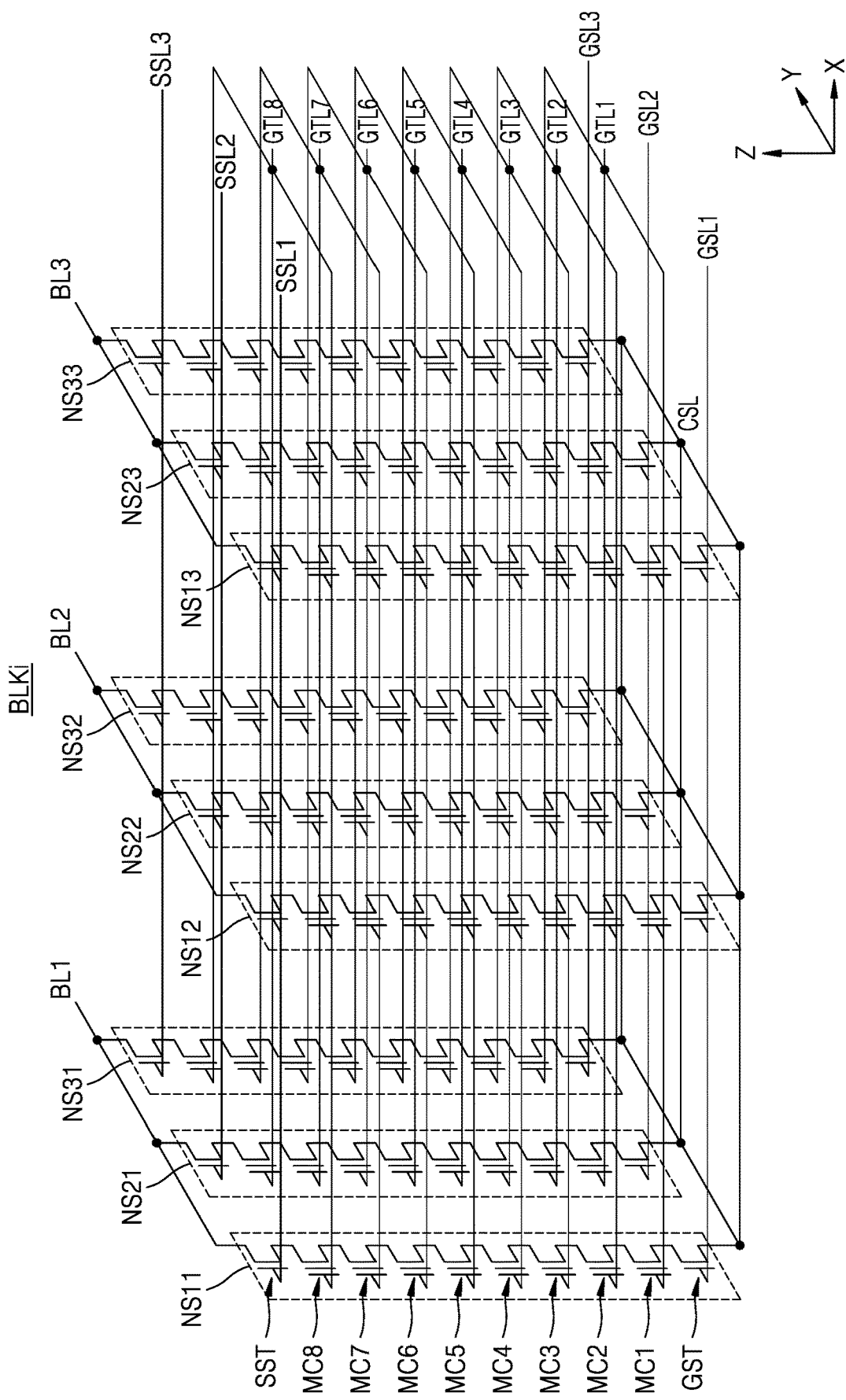
FIG. 28 is a diagram for describing a 3D vertical NAND (VNAND) structure applicable to a UFS device, according to an embodiment.

FIG. 28 is a diagram for describing a 3D VNAND structure which may be implemented in any UFS device described herein, according to an embodiment. For example, NVM 130 of FIG. 1 may be formed with 3D VNAND structure of FIG. 28. When a storage module of the UFS device is implemented by 3D VNAND-type flash memory, each of a plurality of memory blocks of the storage module may be represented by an equivalent circuit, as shown in FIG. 28. A memory block BLKi illustrated in FIG. 28 is a 3D memory block having a 3D structure on a substrate (e.g., a substrate of a semiconductor chip (memory chip) of NVM 130). For example, a plurality of memory NAND strings of the memory block BLKi may be formed in a direction perpendicular to the substrate.

Referring to FIG. 28, the memory block BLKi may include a plurality of memory NAND strings NS11 through NS33 between bit lines BL1, BL2, and BL3 and a common source line CSL. Each of the memory NAND strings NS11 through NS33 may include a string selection transistor SST, a plurality of memory cells MC1 through MC8, and a ground selection transistor GST. Although each of the memory NAND strings NS11 through NS33 includes eighth memory cells MC1 through MC8 in FIG. 28, embodiments are not limited thereto.

The string selection transistor SST may be connected to a corresponding one of string selection lines SSL1, SSL2, and SSL3. The memory cells MC1 through MC8 may be respectively connected to corresponding gate lines GTL1 through GTL8. The gate lines GTL1 through GTL8 may correspond to word lines, and some of the gate lines GTL1 through GTL8 may correspond to dummy word lines. The ground selection transistor GST may be connected to a corresponding one of ground selection lines GSL1, GSL2, and GSL3. The string selection transistor SST may be connected to a corresponding one of the lines BL1, BL2, and BL3, and the ground selection transistor GST may be connected to the common source line CSL.

Gate lines (e.g., GTL1) at the same height may be connected in common to one another, and the ground selection lines GSL1, GSL2, and GSL3 and the string selection lines SSL1, SSL2, and SSL3 may be separated from one another. Although the memory block BLKi are connected to the eight gate lines GTL1 through GTL8 and three lines BL1, BL2, and BL3 in FIG. 28, embodiments are not limited thereto.

Figure 29:
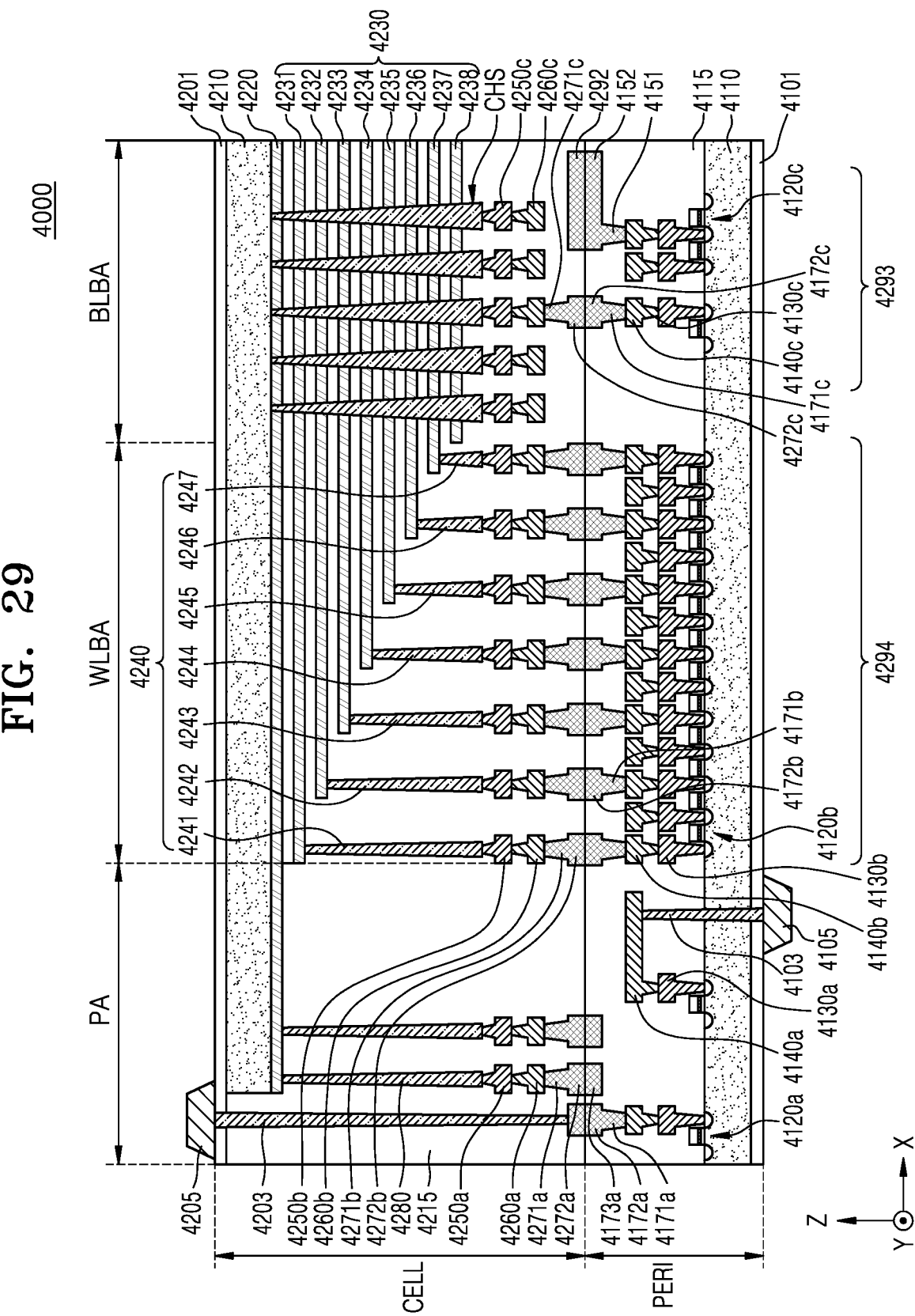
FIG. 29 is a diagram for describing a bonding VNAND (B-VNAND) structure applicable to a UFS device, according to an embodiment.

FIG. 29 is a diagram for describing a bonding VNAND (B-VNAND) structure applicable to UFS devices described herein, according to an embodiment. When NVM included in a UFS device according to an embodiment described herein, the NVM may be implemented by a B-VNAND type flash memory, and the NVM may have the structure illustrated in FIG. 29.

Referring to FIG. 29, a memory device 4000 may have a chip-to-chip (C2C) structure. In the C2C structure, an upper chip including a cell area CELL may be formed on a first wafer, a lower chip including a peripheral circuit area PERI may be formed on a second wafer different from the first wafer, and the upper chip may be connected to the lower chip using a bonding method. For example, the bonding method may include a method of electrically connecting a bonding metal formed in a topmost metal layer of the upper chip to a bonding metal formed in a topmost metal layer of the lower chip. For example, when the bonding metal includes copper (Cu), the bonding method may include a Cu—Cu bonding method. The bonding metal may include aluminum or tungsten.

Each of the peripheral circuit area PERI and the cell area CELL of the memory device 4000 may include an external pad bonding area PA, a word line bonding area WLBA, and a bit line bonding area BLBA.

The peripheral circuit area PERI may include a first substrate 4110, an interlayer insulating layer 4115, a plurality of circuit devices 4120a, 4120b, and 4120c formed in the first substrate 4110, first metal layers 4130a, 4130b, and 4130c respectively connected to the circuit devices 4120a, 4120b, and 4120c, and second metal layers 4140a, 4140b, and 4140c respectively formed on the first metal layers 4130a, 4130b, and 4130c. In an embodiment, the first metal layers 4130a, 4130b, and 4130c may include tungsten having a relatively higher resistance, and the second metal layers 4140a, 4140b, and 4140c may include copper having a relatively lower resistance.

In this specification, only the first metal layers 4130a, 4130b, and 4130c and the second metal layers 4140a, 4140b, and 4140c are illustrated and described, but embodiments are not limited thereto. At least one metal layer may be further formed on the second metal layers 4140a, 4140b, and 4140c. At least a portion of the at least one metal layer on the second metal layers 4140a, 4140b, and 4140c may include aluminum, which has a lower resistance than copper included in the second metal layers 4140a, 4140b, and 4140c.

The interlayer insulating layer 4115 may be arranged on the first substrate 4110 to cover the circuit devices 4120a, 4120b, and 4120c, the first metal layers 4130a, 4130b, and 4130c, and the second metal layers 4140a, 4140b, and 4140c and may include an insulating material such as silicon oxide or silicon nitride.

Lower bonding metals 4171b and 4172b may be formed on the second metal layer 4140b in the word line bonding area WLBA. In the word line bonding area WLBA, the lower bonding metals 4171b and 4172b of the peripheral circuit area PERI may be electrically connected to upper bonding metals 4271b and 4272b of the cell area CELL using a bonding method. The lower bonding metals 4171b and 4172b and the upper bonding metals 4271b and 4272b may include aluminum, copper, or tungsten.

The cell area CELL may provide at least one memory block. The cell area CELL may include a second substrate 4210 and a common source line 4220. A plurality of word lines 4231 through 4238 (collectively denoted by 4230) may be stacked on the second substrate 4210 in a direction (e.g., a Z-axis direction) perpendicular to a top surface of the second substrate 4210. String selection lines may be arranged above the word lines 4230 and a ground selection line may be arranged below the word lines 4230. The word lines 4230 may be arranged between the string selection lines and the ground selection line.

In the bit line bonding area BLBA, a channel structure CHS may extend in the direction perpendicular to the top surface of the second substrate 4210 and pass through the word lines 4230, the string selection lines, and the ground selection line. The channel structure CHS may include a data storage layer, a channel layer, and a buried insulating layer. The channel layer may be electrically connected to a first metal layer 4250c and a second metal layer 4260c. For example, the first metal layer 4250c may correspond to a bit line contact, and the second metal layer 4260c may correspond to a bit line and may be referred to as a bit line 4260c below. In an embodiment, the bit line 4260c may extend in a first direction (e.g., a Y-axis direction) parallel with the top surface of the second substrate 4210.

In the embodiment of FIG. 29, an area, in which the channel structure CHS and the bit line 4260c are arranged, may be defined as the bit line bonding area BLBA. The bit line 4260c may be electrically connected to circuit devices 4120c which provide a page buffer 4293 in the peripheral circuit area PERI, in the bit line bonding area BLBA. For example, the bit line 4260c may be connected to upper bonding metals 4271c and 4272c in the bit line bonding area BLBA, and the upper bonding metals 4271c and 4272c may be connected to lower bonding metals 4171c and 4172c connected to the circuit devices 4120c of the page buffer 4293.

In the word line bonding area WLBA, the word lines 4230 may extend in a second direction (e.g., an X-axis direction) parallel with the top surface of the second substrate 4210 and may be connected to a plurality of cell contact plugs 4241 through 4247 (collectively denoted by 4240). The word lines 4230 may be connected to the cell contact plugs 4240 through pads which are provided by at least some of the word lines 4230 extending in different lengths in the second direction. A first metal layer 4250b and a second metal layer 4260b may be sequentially stacked on each of the cell contact plugs 4240 connected to the word lines 4230. The cell contact plugs 4240 in the word line bonding area WLBA may be connected to the peripheral circuit area PERI through the upper bonding metals 4271b and 4272b of the cell area CELL and the lower bonding metals 4171b and 4172b of the peripheral circuit area PERI.

The cell contact plugs 4240 may be electrically connected to circuit devices 4120b which provide a row decoder 4294 in the peripheral circuit area PERI. In an embodiment, operating voltages of the circuit devices 4120b providing the row decoder 4294 may be different from operating voltages of the circuit devices 4120c providing the page buffer 4293. For example, the operating voltages of the circuit devices 4120c providing the page buffer 4293 may be greater than the operating voltages of the circuit devices 4120b providing the row decoder 4294.

A common source line contact plug 4280 may be arranged in the external pad bonding area PA. The common source line contact plug 4280 may include a conductive material such as metal, a metal compound, or polysilicon and may be electrically connected to the common source line 4220. A first metal layer 4250a and a second metal layer 4260a may be sequentially stacked on the common source line contact plug 4280. For example, an area in which the common source line contact plug 4280, the first metal layer 4250a, and the second metal layer 4260a are arranged may be defined as the external pad bonding area PA.

First and second input/output pads 4105 and 4205 may be arranged in the external pad bonding area PA. Referring to FIG. 29, a lower insulating film 4101 covering a bottom surface of the first substrate 4110 may be formed below the first substrate 4110, and the first input/output pad 4105 may be formed on the lower insulating film 4101. The first input/output pad 4105 may be connected to at least one of the circuit devices 4120a, 4120b, and 4120c of the peripheral circuit area PERI through a first input/output contact plug 4103 and may be isolated from the first substrate 4110 by the lower insulating film 4101. A side insulating film may be arranged between the first input/output contact plug 4103 and the first substrate 4110 to electrically isolate the first input/output contact plug 4103 from the first substrate 4110.

Referring to FIG. 29, an upper insulating film 4201 covering a top surface of the second substrate 4210 may be formed above the second substrate 4210, and the second input/output pad 4205 may be arranged on the upper insulating film 4201. The second input/output pad 4205 may be connected to at least one of the circuit devices 4120*a*, 4120*b*, and 4120*c* of the peripheral circuit area PERI through a second input/output contact plug 4203. For example, the second input-output contact plug 4203 may be connected to the circuit element 4120*a* through lower bonding metals 4171*a* and 4172*a*.

According to embodiments, the second substrate 4210 and the common source line 4220 may not be arranged in an area in which the second input/output contact plug 4203 is arranged. The second input/output pad 4205 may not overlap the word lines 4230 in a third direction (e.g., the Z-axis direction). Referring to FIG. 29, the second input/output contact plug 4203 may be separated from the second substrate 4210 in the direction parallel with the top surface of the second substrate 4210 and may pass through an interlayer insulating layer 4215 of the cell area CELL to be connected to the second input/output pad 4205.

According to embodiments, the first input/output pad 4105 and the second input/output pad 4205 may be selectively formed. For example, the memory device 400 may include only the first input/output pad 4105 on the first substrate 4110 or only the second input/output pad 4205 on the second substrate 4210. Alternatively, the memory device 4000 may include both the first input/output pad 4105 and the second input/output pad 4205.

A metal pattern of a topmost metal layer may be provided as a dummy pattern in the external pad bonding area PA of each of the cell area CELL and the peripheral circuit area PERI, or the topmost metal layer may be empty.

In correspondence to an upper metal pattern 4272*a* in the topmost metal layer of the cell area CELL, a lower metal pattern 4173*a* having the same shape as upper metal pattern 4272*a* of the cell area CELL may be formed in a topmost metal layer of the peripheral circuit area PERI in the external pad bonding area PA. The lower metal pattern 4173*a* in the topmost metal layer of the peripheral circuit area PERI may not be connected to a contact in the peripheral circuit area PERI. Similarly, in correspondence to a lower metal pattern in the topmost metal layer of the peripheral circuit area PERI in the external pad bonding area PA, an upper metal pattern having the same shape as lower metal pattern of the peripheral circuit area PERI may be formed in the topmost metal layer of the cell area CELL.

The lower bonding metals 4171*b* and 4172*b* may be formed on the second metal layer 4140*b* in the word line bonding area WLBA. In the word line bonding area WLBA, the lower bonding metals 4171*b* and 4172*b* of the peripheral circuit area PERI may be electrically connected to the upper bonding metals 4271*b* and 4272*b* of the cell area CELL using a bonding method.

In correspondence to a lower metal pattern 4152 formed in the topmost metal layer of the peripheral circuit area PERI, an upper metal pattern 4292 having the same shape as the lower metal pattern 4152 of the peripheral circuit area PERI may be formed in the bit line bonding area BLBA on the topmost metal layer of the cell area CELL. A contact may not be formed on the upper metal pattern 4292 in the topmost metal layer of the cell area CELL. For example, the lower metal pattern 4152 may be connected to the circuit element 4120*c* through a lower bonding metal 4151.

While the inventive concept has been particularly shown and described with reference to embodiments thereof, it will be understood that various changes in form and details may be made therein without departing from the spirit and scope of the following claims.

What is claimed is:

1. A link startup method of a storage device, the link startup method comprising:
receiving a line-reset signal from a host through a line connected to an input signal pin of the storage device;
comparing a length of the received line-reset signal with a first reference time; and
performing a link startup operation in a high-speed mode or a low-speed mode between the storage device and the host in response to the comparing,
wherein the high-speed mode achieves a linkup state between the host and the storage device faster than the low-speed mode, and
wherein the performing of the link startup operation comprises, in response to the length of the line-reset signal being less than the first reference time, performing the link startup operation in the high-speed mode.

2. The link startup method of claim 1,
wherein the receiving of the line-reset signal comprises receiving, from the host, the line-reset signal, wherein the line has a positive differential line voltage, and
wherein the comparing of the length of the line-reset signal with the first reference time comprises comparing a length of a line-reset period, in which the line has the positive differential line voltage, with the first reference time.

3. The link startup method of claim 2,
wherein the input signal pin includes a positive input signal pin configured to receive a positive input signal and a negative input signal pin configured to receive a negative input signal, and
wherein the line includes a positive wire connected to the positive input signal pin and a negative wire connected to the negative input signal pin, and
wherein the receiving of the line-reset signal comprises receiving the line-reset signal in which a voltage level of the positive wire is higher than a voltage level of the negative wire.

4. The link startup method of claim 3, wherein the comparing of the length of the line-reset signal with the first reference time comprises:
generating a differential line voltage by comparing the voltage level of the positive wire with the voltage level of the negative wire;
generating a system clock count value by counting the number of clocks in a system clock during which the differential line voltage has a first state; and
determining the length of the line-reset signal based on the differential line voltage and the system clock count value.

5. The link startup method of claim 1, wherein the comparing of the length of the line-reset signal with the first reference time comprises:
sensing an output voltage corresponding to a differential line voltage of the line at a first time point by using a resistor-capacitor (RC) filter having a time constant corresponding to the first reference time; and
generating a trigger signal based on the sensed output voltage.

6. The link startup method of claim 1, wherein the first reference time is 300 μs.

7. The link startup method of claim 1, further comprising, before the comparing of the length of the line-reset signal with the first reference time, comparing the length of the received line-reset signal with a second reference time that is less than the first reference time.

8. The link startup method of claim 7, wherein the performing of the link startup operation comprises:

in response to the length of the line-reset signal being greater than the second reference time and less than the first reference time, performing the link startup operation in the high-speed mode.

9. The link startup method of claim 7, wherein the second reference time is 200 μs.

10. The link startup method of claim 1,
wherein the storage device includes an interconnect circuit configured to transmit and receive data to and from the host, and
wherein the link startup method further comprising configuring at least one of a physical layer or a link layer of the interconnect circuit in response to the comparing.

11. The link startup method of claim 1, wherein the receiving of the line-reset signal comprises transitioning the line from a negative differential line voltage to a positive differential line voltage.

12. The link startup method of claim 11, wherein the storage device includes an interconnect circuit configured to transmit and receive data to and from the host, the link startup method further comprising:
before the comparing of the length of the line-reset signal with the first reference time, comparing an activate period, in which the line has the negative differential line voltage, with a third reference time; and
when the activate period is less than the third reference time, configuring at least one of a physical layer or a link layer of the interconnect circuit.

13. The link startup method of claim 1, further comprising, before the receiving of the line-reset signal, exiting a hibernate state which is a power saving state.

14. The link startup method of claim 1, wherein the storage device is a Universal Flash Storage (UFS) device that is interconnected to the host through a UFS standard.

15. A link startup method of a storage device, the link startup method comprising:
determining whether a line-reset signal is received from a host through a line connected to an input signal pin of the storage device; and
performing one of
in response to the line-reset signal being received from the host, performing a high-speed mode link startup operation between the storage device and the host; and
when the line-reset signal is not received from the host, performing a low-speed mode link startup operation between the storage device and the host,
wherein the high-speed mode link startup operation achieves a linkup state between the host and the storage device faster than the low-speed mode line startup operation, and
wherein the storage device includes an interconnect circuit configured to transmit and receive data to and from the host, the link startup method further comprising, after the determining, configuring at least one of a physical layer or a link layer of the interconnect circuit to perform the high-speed mode link startup operation or the low-speed mode link startup operation.

16. The link startup method of claim 15, wherein the determining of whether the line-reset signal is received comprises determining whether there is a line-reset period in which the line has a positive differential line voltage.

17. A link startup method of a storage system including a storage device and a host, the link startup method comprising:
performing a high-speed mode link startup operation between the storage device and the host;
determining whether the high-speed mode link startup operation is completed;
when it is determined that the high-speed mode link startup operation is completed, determining whether a linkup between the storage device and the host as a result of the high-speed mode link startup operation was successful; and
when the linkup was not successful, performing a low-speed mode link startup operation between the storage device and the host,
wherein the high-speed mode link startup operation achieves a linkup state between the host and the storage device faster than the low-speed mode line startup operation, and
wherein the determining of whether the high-speed mode link startup operation is completed comprises determining whether a threshold time has elapsed from the start of the high-speed mode link startup operation.

18. The link startup method of claim 17, wherein the performing of the high-speed mode link startup operation comprises:
performing a first trigger event of exchanging physical lane numbers of a transmission lane and a reception lane between the storage device and the host;
performing a second trigger event of exchanging information on the transmission lane and information on the reception lane between the storage device and the host; and
performing a third trigger event of exchanging logical lane information on the transmission lane and the reception lane between the storage device and the host.

* * * * *